(12) United States Patent
Batten et al.

(10) Patent No.: US 10,814,561 B2
(45) Date of Patent: Oct. 27, 2020

(54) JOINING METHOD

(71) Applicant: Magma Global Limited, Portsmouth (GB)

(72) Inventors: Alex Batten, Dinas Powys (GB);
James Westley, Southampton (GB);
Edward William Vernon-Harcourt, Steyning (GB); Damon Roberts, Upham (GB); Martin Peter William Jones, Chichester (GB)

(73) Assignee: Magma Global Limited, Portsmouth (GB)

( * ) Notice: Subject to any disclaimer, the term of this patent is extended or adjusted under 35 U.S.C. 154(b) by 0 days.

(21) Appl. No.: 15/569,697

(22) PCT Filed: Apr. 29, 2016

(86) PCT No.: PCT/GB2016/051256
§ 371 (c)(1),
(2) Date: Oct. 26, 2017

(87) PCT Pub. No.: WO2016/174474
PCT Pub. Date: Nov. 3, 2016

(65) Prior Publication Data
US 2018/0297292 A1   Oct. 18, 2018

(30) Foreign Application Priority Data
Apr. 30, 2015   (GB) .................................. 1507393.5

(51) Int. Cl.
*B29C 65/00*   (2006.01)
*B29C 65/34*   (2006.01)
(Continued)

(52) U.S. Cl.
CPC ...... *B29C 65/3436* (2013.01); *B29C 65/3468* (2013.01); *B29C 65/3492* (2013.01);
(Continued)

(58) Field of Classification Search
CPC ... B29C 65/34; B29C 65/3416; B29C 65/342; B29C 65/3444; B29C 65/3452; B29C 65/3456; B29C 65/3484; B29C 65/3492
(Continued)

(56) References Cited

U.S. PATENT DOCUMENTS 3,061,503 A * 10/1962 Gould ................... B29C 65/344
139/425 R
4,176,274 A * 11/1979 Lippera ................. B29C 65/342
219/522
(Continued)

FOREIGN PATENT DOCUMENTS

EP   0 343 757   11/1989
EP   0 924 054   6/1999
(Continued)

*Primary Examiner* — Mark A Osele
*Assistant Examiner* — Nickolas R Harm
(74) *Attorney, Agent, or Firm* — Levy & Grandinetti

(57) ABSTRACT

A method for joining primary and secondary members includes providing a primary member, a secondary member and a heating element which is joined to one of the primary and secondary members. The heating element includes an electrically insulating matrix material and an electrically conductive reinforcing element extending through the matrix material. The method further includes bringing the other of the primary and secondary members and the heating element into engagement and controlling a flow of electrical current in the reinforcing element so as to resistively heat and fuse at least some of the matrix material of the heating element with a matrix material of the other of the primary and secondary members. The method may be used to join a primary member such as a composite tubular and a secondary member such as a component for terminating the composite tubular.

17 Claims, 9 Drawing Sheets

(51) Int. Cl.
H05B 3/14 (2006.01)
H05B 3/44 (2006.01)
H05B 3/58 (2006.01)
F16L 33/28 (2006.01)
B29C 65/50 (2006.01)
B29C 65/56 (2006.01)
B29C 65/72 (2006.01)
B29C 65/48 (2006.01)
B29C 57/04 (2006.01)
B29L 23/00 (2006.01)

(52) U.S. Cl.
CPC ...... B29C 65/3496 (2013.01); B29C 65/4815 (2013.01); B29C 65/5014 (2013.01); B29C 65/5021 (2013.01); B29C 65/5057 (2013.01); B29C 65/561 (2013.01); B29C 65/562 (2013.01); B29C 65/72 (2013.01); B29C 66/1122 (2013.01); B29C 66/1142 (2013.01); B29C 66/1222 (2013.01); B29C 66/1226 (2013.01); B29C 66/3452 (2013.01); B29C 66/3472 (2013.01); B29C 66/5221 (2013.01); B29C 66/5344 (2013.01); B29C 66/723 (2013.01); B29C 66/91214 (2013.01); B29C 66/91221 (2013.01); B29C 66/91423 (2013.01); B29C 66/91655 (2013.01); B29C 66/961 (2013.01); F16L 33/28 (2013.01); H05B 3/146 (2013.01); H05B 3/44 (2013.01); H05B 3/58 (2013.01); B29C 57/04 (2013.01); B29C 65/34 (2013.01); B29C 65/342 (2013.01); B29C 65/3416 (2013.01); B29C 65/3444 (2013.01); B29C 65/3456 (2013.01); B29C 65/3484 (2013.01); B29C 66/71 (2013.01); B29C 66/7212 (2013.01); B29C 66/91213 (2013.01); B29L 2023/22 (2013.01); H05B 2203/017 (2013.01); H05B 2203/037 (2013.01)

(58) Field of Classification Search
USPC ... 156/293, 294, 304.1, 304.2, 304.3, 304.5, 156/304.6, 308.2, 503
See application file for complete search history.

(56) References Cited

U.S. PATENT DOCUMENTS

| | | | | |
|---|---|---|---|---|
| 5,286,952 | A * | 2/1994 | McMills | B29C 61/006 219/535 |
| 5,500,510 | A | 3/1996 | Kumagai | |
| 6,131,954 | A * | 10/2000 | Campbell | B29C 65/342 285/21.1 |
| 6,164,702 | A | 12/2000 | Hauber et al. | |
| 6,375,226 | B1 * | 4/2002 | Dickinson | B29C 65/342 285/21.2 |
| 7,034,251 | B1 | 4/2006 | Child et al. | |
| 8,942,552 | B2 * | 1/2015 | Pionetti | F16L 1/15 285/41 |
| 9,080,702 | B2 * | 7/2015 | Rukavina Mikusic | B29C 66/71 |
| 2009/0277579 | A1 * | 11/2009 | Marelli | B29C 65/004 156/293 |
| 2013/0087278 | A1 * | 4/2013 | Chang | B32B 37/06 156/275.5 |

FOREIGN PATENT DOCUMENTS

| | | |
|---|---|---|
| GB | 2504687 | 2/2014 |
| GB | 2518006 | 3/2015 |
| WO | WO 89/05230 | 6/1989 |
| WO | WO 89/12545 | 12/1989 |

* cited by examiner

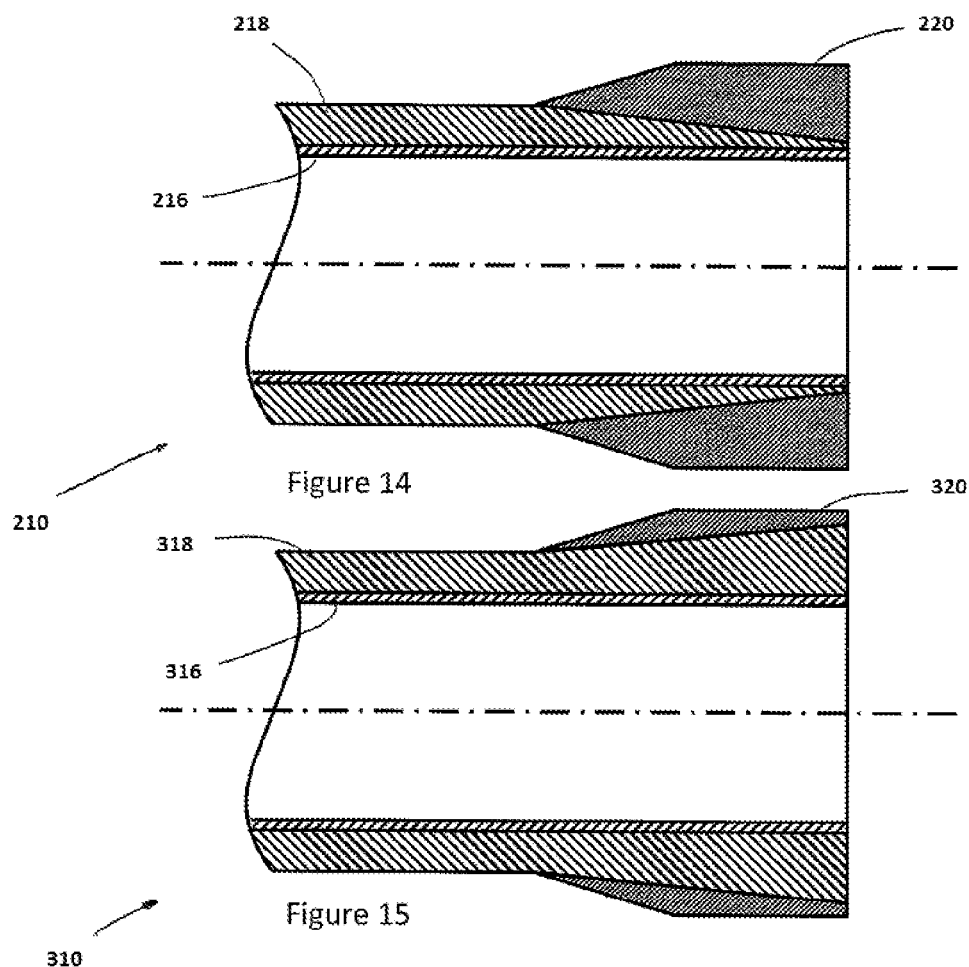
Figure 14
Figure 15
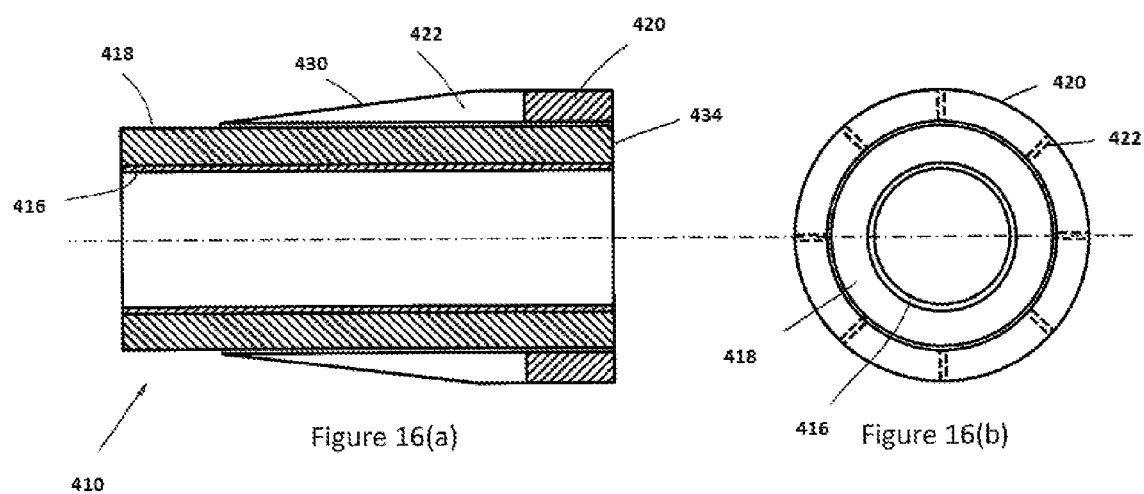
Figure 16(a)
Figure 16(b)

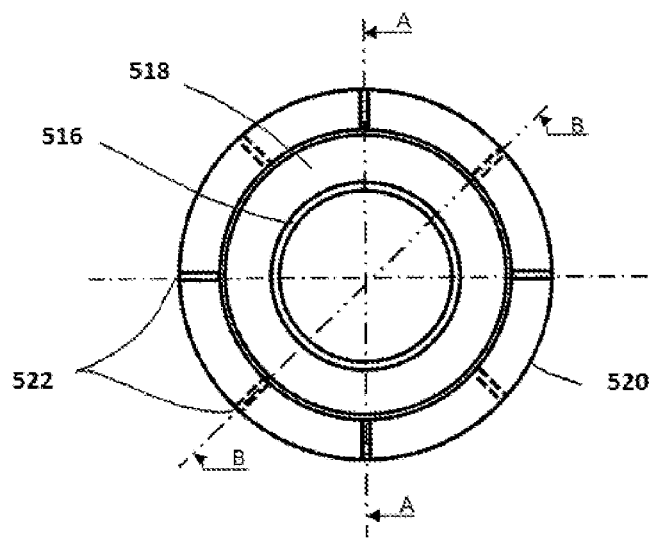
Figure 17(a)
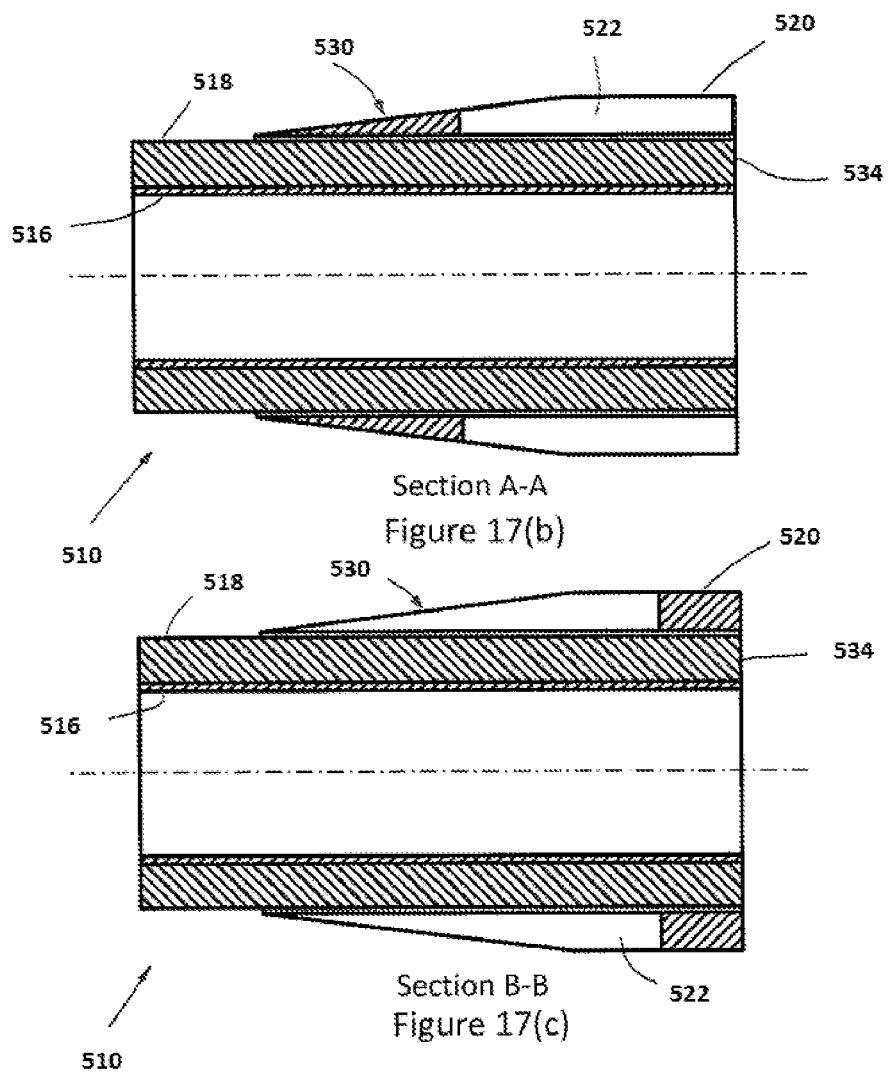
Section A-A
Figure 17(b)
Section B-B
Figure 17(c)

JOINING METHOD

FIELD

A method for joining a primary member such as a composite tubular and a secondary member such as a component is described herein. The method may be suitable for use in particular, though not exclusively, for terminating a composite tubular.

BACKGROUND

It is known to use composite tubulars in place of steel tubulars for various reasons. For example, a composite tubular may be capable of withstanding greater strains and may be lighter than an equivalently sized steel tubular. In addition, the manufacturing process for composite tubulars may allow for different portions of the tubular to be constructed differently. For example, different portions of a composite tubular may be reinforced differently or may permit an additional feature or device, such as an electrical device, to be at least partially embedded within or attached to a wall of the composite tubular.

When terminating a composite tubular such as a composite fluid conduit for connection to a further member such as a further fluid conduit, it may be desirable to form a built-up region having a greater wall thickness at or adjacent to an end of the composite tubular. This may be achieved by applying additional layers of composite tape to an outer surface of the composite tubular at or adjacent to the end of the composite tubular. The resulting built-up region may subsequently be machined to a desired geometry. However, such known techniques for locally increasing wall thickness at or adjacent to the end of a composite tubular may be time-consuming and/or costly.

SUMMARY

It should be understood that one or more features of any of the methods or apparatus described herein may apply alone or in any combination in relation to any of the other methods or apparatus described herein.

A method for joining primary and secondary members is described herein, comprising:

providing a primary member, a secondary member, and a heating element, wherein the heating element is joined to one of the primary and secondary members and the heating element includes an electrically insulating matrix material and an electrically conductive reinforcing element extending through the matrix material;

bringing the other of the primary and secondary members and the heating element into engagement; and controlling a flow of electrical current in the reinforcing element so as to resistively heat and fuse at least some of the matrix material of the heating element with a matrix material of the other of the primary and secondary members.

Such a method may result in the secondary member being joined to the heating element and, therefore, also to the primary member to form an assembly.

The primary and secondary members may be formed separately from one another. The method may comprise forming the primary and secondary members separately from one another. When the primary and secondary members are formed separately from one another, the method may permit the primary and secondary members to be joined using a process, rig, set-up and/or machine which is separate from a process, rig, set-up and/or machine used for the formation of the primary and/or secondary members.

The method may comprise joining the heating element with one of the primary and secondary members.

The steps of the method may be performed sequentially in any order or may at least partially overlap. For example, the method may comprise joining the heating element with one of the primary and secondary members before, during and/or after controlling the flow of electrical current in the reinforcing element so as to resistively heat and fuse at least some of the matrix material of the heating element with the matrix material of the other of the primary and secondary members. The method may comprise joining the heating element with one of the primary and secondary members at the same time as controlling the flow of electrical current in the reinforcing element so as to resistively heat and fuse at least some of the matrix material of the heating element with the matrix material of the other of the primary and secondary members.

The heating element may be joined with the primary member.

The method may comprise bringing the secondary member and the heating element into engagement.

The method may comprise controlling a flow of electrical current in the reinforcing element so as to resistively heat and fuse at least some of the matrix material of the heating element with a matrix material of the secondary member.

The method may comprise joining the heating element with the primary member.

The heating element may comprise a plurality of reinforcing elements extending through the matrix material.

Each reinforcing element may be electrically conductive. For example, each reinforcing element may comprise a carbon fibre.

The matrix material of the secondary member may be the same as the matrix material of the heating element. Such a method may result in the matrix material extending continuously between the heating element and the secondary member.

The matrix material of the primary member may be the same as the matrix material of the heating element. Such a method may result in the matrix material extending continuously between the heating element and the primary member.

The method may comprise compressing the heating element and the secondary member together. The method may comprise compressing the heating element and secondary member together by use of a device, such as a press, a roller a mould or the like.

The method may comprise compressing the heating element between the primary and secondary members.

The method may comprise heating the heating element. The method may comprise heating the primary member and/or heating the secondary member. The method may comprise exposing at least one of the heating element and the primary and secondary members to at least one of laser radiation, microwave radiation, a flame, and heated air. The primary member may be tubular. The primary member may comprise a fluid conduit. The primary member may define a through hole. The through hole may define an inner diameter of the primary member. The through hole may allow for passage of fluid or cables through the primary member.

The primary member may define an outer diameter.

The primary member may define a generally cylindrical surface such as a generally cylindrical outer surface.

The primary member may define a tapered surface profile such as a tapered outer surface profile.

The primary member may define a surface which increases in diameter towards an end of the primary member.

The primary member may define an outer surface which increases in diameter towards an end of the primary member.

The primary member may define a surface which decreases in diameter towards an end of the primary member.

The primary member may define an outer surface which decreases in diameter towards an end of the primary member.

The primary and secondary members may be complementary in shape.

The primary and secondary members may have complementary surfaces.

The primary and secondary members may be configured to fit on, against or around one another.

The secondary member may be configured to fit on, against or around the primary member.

The secondary member may be configured to fit on, against or around a surface of the primary member.

The secondary member may be configured to fit on, against or around an outer surface of the primary member. The secondary member may define a tapered surface profile such as a tapered outer surface profile.

The secondary member may define a surface which increases in diameter towards an end of the secondary member.

The secondary member may define an inner surface which increases in diameter towards an end of the secondary member.

The secondary member may define a surface which decreases in diameter towards an end of the secondary member.

The secondary member may define an inner surface which decreases in diameter towards an end of the secondary member.

The secondary member may be configured to fit on, against or around an inner surface of the primary member.

The secondary member may be configured to be joined to the primary member. The secondary member may comprise a component to be joined to the primary member.

The secondary member may define a through hole.

The through hole may be configured to accommodate the first member.

The through hole may define an inner diameter of the secondary member.

The inner diameter of the secondary member may be substantially similar to the outer diameter of the primary member.

The secondary member may be generally annular.

The secondary member may define an outer surface profile such as a tapered outer surface profile. The outer surface profile of the secondary member may provide a surface for engagement by a complementary surface of a connector device such as a connector sleeve, collar or the like. Once the secondary member is joined to the primary member, the outer surface profile of the secondary member may be engaged by the complementary surface of the connector device for connection of the primary member to a further member.

The secondary member may comprise an annular wedge.

The primary member may comprise an outer diameter that is slightly larger than the inner diameter of the secondary member. The slight difference in the outer diameter of the primary member compared to the inner diameter of the secondary member may allow the secondary member to be joined to the primary member by means of press fitting. The secondary member and the primary member may have a Poisson's ratio such that they are able to be press fitted together. The outer diameter of the primary member and the inner diameter of the secondary member may be selected based on the Poisson's ratio of the primary member and the secondary member such that they are able to be press fitted together.

The secondary member may define a slot.

The slot may be aligned generally parallel to a longitudinal axis of the secondary member.

The slot may extend through the secondary member. For example, the slot may extend through a wall of the secondary member.

The slot may extend part way through the secondary member. For example, the slot may extend part way through a wall of the secondary member.

The slot may extend part way along a length of the secondary member. The slot may extend along the whole length of the secondary member.

The secondary member may define a plurality of slots.

Each slot may be aligned generally parallel to a longitudinal axis of the secondary member.

Each slot may extend through the secondary member. For example, each slot may extend through a wall of the secondary member.

Each slot may extend part way through the secondary member. For example, each slot may extend part way through a wall of the secondary member.

Each slot may extend part way along a length of the secondary member. Each slot may extend along the whole length of the secondary member.

Different slots may have the same longitudinal extent. Different slots may have different longitudinal extents.

Each slot may extend from one end of the secondary member towards the other end of the secondary member. Different slots may extend from different ends of the secondary member. For example, adjacent slots may extend from different ends of the secondary member. Different slots may extend from different ends of the secondary member so that the different slots overlap in longitudinal extent in a central section of the secondary member. For example, adjacent slots may extend from different ends of the secondary member so that the adjacent slots overlap in longitudinal extent in a central section of the secondary member. Each slot may extend from the centre of the secondary member towards one or both ends of the secondary member.

The plurality of slots may be distributed circumferentially about the secondary member. For example, the plurality of slots may have a uniform circumferential distribution about the secondary member. The plurality of slots may allow the secondary member and the heating element to be brought into closer engagement and/or to improve the uniformity of contact between the secondary member and the heating element. More specifically, the plurality of slots may reduce the circumferential stiffness or strength of the secondary member to allow the secondary member to conform to, or comply with, the heating element when the secondary member and the heating element are compressed together. The plurality of slots may reduce the circumferential stiffness or strength of a section of the secondary member to allow the section of the secondary member to conform to, or comply with, the heating element when the secondary member and the heating element are compressed together. The plurality of slots may reduce the circumferential stiffness or strength of the secondary member to allow an inner surface of the secondary member to comply with an outer surface of the heating element when the secondary member and the heating element are compressed together. The plurality of slots may reduce the circumferential stiffness or strength of the secondary member to allow an outer surface of the secondary member to comply with an inner surface of the heating element when the secondary member and the heating element are compressed together.

The secondary member may comprise a portion of an annular wedge.

The method may comprise forming and/or shaping the primary or secondary member. The method may comprise forming and/or shaping the primary or secondary member by a machining process, for example, by turning or grinding. The method may comprise forming and/or shaping the primary or secondary member by thermoforming.

The method may comprise forming and/or shaping at least one of the primary and secondary members so as to provide an improved fit therebetween The method may comprise forming and/or shaping the primary or secondary member so as to provide an improved fit between the primary member and a connector device or so as to provide an improved fit between the secondary member and a connector device. Forming and/or shaping the primary or secondary member may reduce any mismatch in tolerances between a surface of the primary member and a complementary surface of a connector device or may reduce any mismatch in tolerances between a surface of a secondary member and a complementary surface of the connector device.

The heating element may be joined to the primary member and the method may comprise:

bringing a plurality of secondary members and the heating element into engagement; and controlling a flow of electrical current in the reinforcing element so as to resistively heat and fuse at least some of the matrix material of the heating element with a matrix material of each of the secondary members.

Each secondary member may comprise a different portion of an annular wedge.

The heating element may be joined to the secondary member and the method may comprise:

bringing a plurality of primary members and the heating element into engagement; and controlling a flow of electrical current in the reinforcing element so as to resistively heat and fuse at least some of the matrix material of the heating element with a matrix material of each of the primary members.

Each primary member may comprise a different portion of a fluid conduit.

The method may comprise:

providing a plurality of heating elements joined with one of the primary and secondary members, each heating element comprising an electrically insulating matrix material and an electrically conductive reinforcing element extending through the matrix material;

bringing the other of the primary and secondary members and each heating element into engagement; and controlling a flow of electrical current in the reinforcing element of each heating element so as to resistively heat and fuse at least some of the matrix material of each heating element with a matrix material of the other of the primary and secondary members.

The method may comprise joining the plurality of heating elements with one of the primary and secondary members.

The number of heating elements may be equal to the number of primary and/or secondary members.

The method may comprise bringing each primary member and each heating element into engagement.

The method may comprise bringing each secondary member and each heating element into engagement.

Each heating element may be shaped to fit onto a surface of an annular wedge. Each heating element may be shaped to fit onto an inner surface of an annular wedge.

The method may comprise joining the heating element with the primary or secondary member during the manufacture of the primary or secondary member. The method may comprise joining the heating element with the primary or secondary member during the manufacture of the primary or secondary member such that the heating element is provided integrally with the primary or secondary member.

The method may comprise forming the heating element on, against or around the primary or secondary member. Forming the heating element in situ on, against or around the primary or secondary member in this way may allow the heating element to be better fitted to the primary or secondary member, and/or may facilitate a better bond between the heating element and the primary or secondary member. This may also avoid any requirement for the heating element to be formed separately and then joined with the primary or secondary member.

The method may comprise depositing the heating element on, or applying the heating element to, the primary or secondary member.

The method may comprise depositing or applying the reinforcing element and the matrix material of the heating element at the same time. For example, the method may comprise providing a composite material including the reinforcing element and the matrix material and depositing or applying the composite material on, or applying the composite material to, the primary or secondary member.

The method may comprise depositing or applying the reinforcing element and the matrix material at different times. The method may comprise depositing the matrix material before and/or after depositing the reinforcing element. The method may comprise applying the matrix material before and/or after applying the reinforcing element.

The heating element may comprise a composite layer sandwiched between two matrix layers.

Forming the heating element may comprise forming a first layer of matrix material on the primary or secondary member, forming a layer of composite material on top of the first layer of matrix material, and then forming a second layer of matrix material on top of the layer of composite material.

The method may comprise pre-forming the matrix material of the heating element as a matrix tape.

The method may comprise applying the matrix tape to the primary or secondary member so as to form the first layer of matrix material.

The method may comprise applying the matrix tape to the primary or secondary member along a pre-determined direction relative to a longitudinal axis of the primary or secondary member.

The method may comprise wrapping or winding the matrix tape on or around the primary or secondary member.

The method may comprise wrapping or winding the matrix tape on or around the primary or secondary member one or more times so as to form the first layer of matrix material.

The method may comprise wrapping or winding different layers of matrix tape at the same angle relative to a longitudinal axis of the primary or secondary member.

The method may comprise wrapping or winding different layers of matrix tape at different angles relative to the longitudinal axis of the primary or secondary member. The different angles may have different magnitudes and/or signs relative to a longitudinal axis of the primary or secondary member. The different angles may have the same magnitude but different signs relative to the longitudinal axis of the primary or secondary member.

The method may comprise pre-forming the composite material as a composite tape. The reinforcing element may be generally aligned along a length of the composite tape. The composite tape may comprise a plurality of reinforcing elements. Each of the reinforcing elements may be generally aligned along a length of the tape. The reinforcing elements may be electrically isolated from one another by the matrix material.

The method may comprise applying the composite tape to the primary or secondary member.

The method may comprise applying the composite tape to the first layer of matrix material.

The method may comprise applying the composite tape at a pre-determined angle relative to a longitudinal axis of the primary or secondary member.

The method may comprise applying the composite tape in a direction which is generally parallel, or which is parallel, to a longitudinal axis of the primary or secondary member.

The method may comprise wrapping or winding the composite tape on or around the primary or secondary member.

The method may comprise wrapping or winding the composite tape on or around the first layer of matrix material.

The method may comprise wrapping or winding the composite tape so as to form a layer of composite material comprising one or more layers of composite tape.

The method may comprise wrapping or winding different layers of composite tape at the same angle relative to a longitudinal axis of the primary or secondary member. The method may comprise wrapping or winding different layers of composite tape at different angles relative to a longitudinal axis of the primary or secondary member.

The method may comprise wrapping or winding a plurality of composite tapes so as to form the layer of composite material. Each composite tape may comprise one or more reinforcing elements. Each reinforcing element may be wrapped or wound over itself. Each reinforcing element may be wrapped or wound over one or more of the reinforcing elements of the other composite tapes.

The method may comprise wrapping or winding a single continuous length of composite tape so as to form the layer of composite material. Each reinforcing element within the single continuous length of composite tape may provide a corresponding continuous electrical current path. Each reinforcing element may be present within one or more composite tape layers. Each reinforcing element may be wrapped or wound over itself.

Forming the heating element may comprise depositing and/or applying the matrix material or the composite material of the heating element at a pre-determined temperature. Forming the heating element may comprise heating the matrix material or the composite material of the heating element before, during and/or after it is deposited and/or applied. Depositing and/or applying the matrix material or the composite material of the heating element at a specific temperature may provide a better bond to the primary or secondary member.

The method may comprise heating the matrix material or the composite material of the heating element by use of at least one of laser radiation, microwave radiation, a flame, and heated air.

The method may comprise compressing the matrix material or the composite material of the heating element during and/or after it is applied.

The method may comprise compressing the matrix material or the composite material of the heating element by use of a device, such as a press, a roller a mould or the like.

The method may comprise forming the heating element separately from the primary or secondary member.

The method may comprise forming, for example depositing or applying, the reinforcing element and the matrix material to a substrate. The substrate may define at least one of a cylindrical surface, a conical surface, a frusto-conical surface, and a planar surface. The substrate may comprise a tube or a sleeve.

The substrate may be formed from the same material as the matrix material.

The method may comprise forming the heating element on the substrate using any of the methods described above for forming the heating element on the primary or secondary member.

The method may comprise wrapping or winding the matrix tape and/or the composite tape on or around the substrate. The method may comprise forming a first layer of matrix material on the substrate, forming a layer of composite material on the first layer of matrix material, and then forming a second layer of matrix material on the layer of composite material.

The method may comprise bringing the separately formed heating element into engagement with the primary or secondary member.

The method may comprise fitting the separately formed heating element on, over or around, or applying the heating element to, the primary or secondary member. The separately formed heating element may be flexible for this purpose.

The method may comprise compressing the separately formed heating element and the primary or secondary members together. The method may comprise compressing the separately formed heating element and the primary or secondary member together using a clamp, a roller, a mould or the like.

The method may comprise applying a bonding agent such as an adhesive, a resin, for example an epoxy or polyester resin, a molten compound, for example a molten thermoplastic or the like to at least one of the heating element and the primary or secondary member. The method may comprise bringing the heating element into engagement with the primary or secondary member before, during and/or after applying the bonding agent.

The method may comprise fusing the matrix material of the heating element with the matrix material of the primary member. The matrix material may then extend continuously between the heating element and the primary member.

The method may comprise incorporating a device or element into the heating element in order to measure a temperature of the heating element during and/or after the flow of the electrical current in the reinforcing element. The device may, for example, comprise a Fibre Bragg Grating (FBG), a resistance temperature detector (RTD), a thermistor, a thermocouple or the like for this purpose.

The method may comprise controlling the flow of electrical current in the reinforcing element so as to resistively heat and fuse at least some of the matrix material of the heating element with a matrix material of the primary member so as to join the heating element with the primary member.

The flow of electrical current in the reinforcing element may be an alternating current (AC) or a direct current (DC). Without wish to be bound by theory, it is thought that driving AC through one reinforcing element may induce an AC in one or more adjacent reinforcing elements. This may serve to generate heat more uniformly. The method may comprise connecting each reinforcing element to an electrical source. The method may comprise using the electrical source to control the flow of electrical current through each reinforcing element.

The method may comprise connecting different reinforcing elements to the electrical source at different times. The method may comprise using the electrical source to drive the electrical current through different reinforcing elements at different times. Driving the electrical current through different reinforcing elements at different times may allow for heating of the matrix material of the heating element in selected regions. Driving the electrical current through different reinforcing elements at different times may allow for heating of the matrix material of the primary and/or secondary members in selected regions.

The method may comprise connecting a pair of reinforcing elements to the electrical source more frequently than the other reinforcing elements. The method may comprise using the electrical source to drive the electrical current through the pair of reinforcing elements more frequently than the other reinforcing elements. Such a method may increase the degree of heating of the matrix material adjacent to the pair of reinforcing elements particularly in a region of convergence of the pair of reinforcing elements where the pair of reinforcing elements converge towards one another, for example where the pair of reinforcing elements overlap and/or engage one another.

The method may comprise connecting a pair of reinforcing elements to the electrical source less frequently than the other reinforcing elements. The method may comprise using the electrical source to drive the electrical current through the pair of reinforcing elements less frequently than the other reinforcing elements. Such a method may decrease the degree of heating of the matrix material adjacent to the pair of reinforcing elements particularly in a region of convergence of the pair of reinforcing elements where the pair of reinforcing elements converge towards one another, overlap and/or engage one another.

The method may comprise connecting the reinforcing elements of different composite tapes to the electrical source at different times. The method may comprise using the electrical source to drive the electrical current through the reinforcing elements of the different composite tapes at different times.

The method may comprise connecting a pair of composite tapes to the electrical source more frequently than the other composite tapes. The method may comprise using the electrical source to drive the electrical current through the pair of composite tapes more frequently than the other composite tapes. Such a method may increase the degree of heating of the matrix material within, or adjacent to, the pair of composite tapes particularly in a region of convergence of the pair of composite tapes where the pair of composite tapes converge towards one another, overlap and/or engage one another.

The method may comprise connecting a pair of composite tapes to the electrical source less frequently than the other composite tapes. The method may comprise using the electrical source to drive the electrical current through the pair of composite tapes less frequently than the other composite tapes. Such a method may decrease the degree of heating of the matrix material within, or adjacent to, the pair of composite tapes particularly in a region of convergence of the pair of composite tapes where the pair of composite tapes converge towards one another, overlap and/or engage one another.

The method may comprise controlling the distribution and/or density of the reinforcing elements in the heating element for selective heating of different regions of the heating element. For example, the method may comprise increasing a density of the reinforcing elements and/or a density of regions of convergence of the reinforcing elements in a portion of the heating element such as a central portion of the heating element which may be susceptible to more rapid cooling. Such an arrangement of the reinforcing elements may allow more heat to be generated in the central portion of the heating element. This may allow a more uniform temperature distribution across the matrix material of the heating element during heating of the matrix material of the heating element. This may provide a more uniform weld between the matrix material of the heating element and the matrix material of the primary or secondary member once fusing is complete. This may provide a more uniform weld between the matrix material of the heating element and the matrix material of the primary or secondary member once fusing is complete.

The method may comprise forming and/or shaping the primary or secondary member once fusing is complete. The method may comprise removing material from the primary or secondary member once fusing is complete. The method may comprise forming and/or shaping the primary or secondary member once fusing is complete by a machining process, for example, by turning or grinding. The method may comprise forming and/or shaping the primary or secondary member once fusing is complete by thermoforming. Forming and/or shaping the primary or secondary member may provide an improved fit between the primary member and a connector device or may provide an improved fit between the secondary member and a connector device. Forming and/or shaping the primary or secondary member may reduce any mismatch in tolerances between a surface of the primary member and a complementary surface of the connector device or may reduce any mismatch in tolerances between a surface of the secondary member and a complementary surface of the connector device.

The method may comprise connecting two or more different reinforcing elements to the electrical source at the same time. The method may comprise using the electrical source to drive the electrical current through two or more different reinforcing elements at the same time.

The method may comprise connecting each reinforcing element to the electrical source at a point of protrusion from the matrix material.

The method may comprise removing a portion of the electrically insulating matrix material from the heating element. This may serve to expose the reinforcing element or may increase a length of the reinforcing element exposed to allow an electrical connection to be made thereto.

The method may comprise removing matrix material from the heating element by any appropriate means, for example by burning or melting the matrix material, by machining the matrix material, or the like.

The method may comprise preparing the reinforcing element of the heating element before connecting the reinforcing element to the electrical source. The method may comprise preparing the reinforcing element so as to remove any electrically insulating matrix material that remains on the reinforcing element. The method may comprise scrubbing and/or heating the reinforcing element before connecting the reinforcing element to the electrical source. The method may comprise applying a surface material to the reinforcing element. Applying the surface material may facilitate or enhance the subsequent electrical connection to the electrical source. The surface material may be electrically conductive. The surface material may, for example be silver paint. The method may comprise applying the surface material by any appropriate method, for example, spraying, painting or the like.

Controlling the flow of electrical current in the reinforcing element may comprise controlling the flow of electrical current so as to increase a temperature of the heating element to a desired temperature.

Controlling the flow of electrical current in the reinforcing element may comprise:

increasing the electrical current until at least some of the matrix material of the heating element melts; and reducing the electrical current until the melted matrix material of the heating element solidifies.

Controlling the flow of electrical current in the reinforcing element may comprise:

increasing the electrical current until at least some of the matrix material of the heating element reaches a curing or setting temperature; and maintaining the temperature at a level to allow the matrix material to cure or set.

Controlling the flow of electrical current in the reinforcing element may comprise inducing an electrical current in the reinforcing element, for example, by exposing the reinforcing element to a time-varying magnetic field.

The method may comprise cooling the heated matrix material. Cooling the heated matrix material may result in solidification of the matrix material after fusion has taken place.

Fusing the matrix material of the heating element with the matrix material of the primary and/or secondary members may result in the heating element being permanently attached to the primary and/or secondary members. Fusing of the matrix material of the heating element with the matrix material of the primary and/or secondary members may cause the matrix material of the heating element and the primary and/or secondary members to extend continuously therebetween such that the heating element and the primary and/or secondary members are indistinct.

The primary and secondary members may be defined by different portions of a unitary member. The primary member may be defined by a primary portion of the unitary member and the secondary member may be defined by a secondary portion of the unitary member. The method may comprise shaping the unitary member, for example by removing material from the unitary member, so as to define the primary and secondary portions. For example, the method may comprise removing material of the unitary member by machining, melting or the like.

The method may comprise forming a recess in the unitary member. The recess may define the primary portion of the unitary member to one side of the recess and the secondary portion of the unitary member to the other side of the recess.

The method may comprise inserting the heating element into the recess.

The method may comprise compressing the heating element between the primary and secondary portions of the unitary member.

The primary member may be defined by a primary end portion of the unitary member and the secondary member may be defined by a secondary end portion of the unitary member.

The unitary member may be a tubular member.

The method may comprise forming an annular recess in an end face of the tubular member. The annular recess may define a primary annular end portion of the tubular member radially inwardly of the annular recess and a secondary annular end portion of the tubular member radially outwardly of the annular recess.

The method may comprise forming the annular recess at one end of a generally cylindrical interface between an inner layer of the tubular member and an adjacent layer of the tubular member. The method may comprise forming the annular recess with an outwardly flared profile.

The method may comprise inserting the heating element into the annular recess. The heating element may be configured for insertion into the annular recess. The heating element may be configured for engaging the primary and/or secondary annular end portions of the tubular member. The heating element may be thin-walled. The heating element may define a conical surface for engaging a flared surface of the annular recess.

The method may comprise inserting a moulding tool into a through bore defined by the tubular member. The moulding tool may define a conical moulding surface. The moulding tool may be frusto-conical in shape.

The method may comprise heating the moulding tool before or during insertion into the through bore of the tubular member. The moulding tool may be heated by any appropriate means. For example, the moulding tool may be heated by contact with a heat source such as a flame, heated air or the like. The moulding tool may be heated electrically. The method may comprise inserting the moulding tool into the through bore of the tubular member adjacent to the annular recess.

The method may comprise forcing the moulding tool against the primary annular end portion of the tubular member so as to deform the primary annular end portion of the tubular member radially outwardly. The method may comprise forcing the moulding tool against the primary annular end portion of the tubular member so as to deform the primary annular end portion of the tubular member into the annular recess. The method may comprise forcing the moulding tool against the primary annular end portion of the tubular member so as to deform the primary annular end portion of the tubular member into engagement with the heating element. The method may comprise forcing the moulding tool against the primary annular end portion of the tubular member so as to bring the primary and secondary annular end portions of the tubular member into engagement with the heating element.

The heating element may comprise a carbon fibre, glass fibre or metal reinforcing element. The heating element may comprise different types of reinforcing elements. For example, the heating element may comprise one or more carbon fibre reinforcing elements and one or more glass fibre reinforcing elements.

The primary member may comprise at least one reinforcing element. The primary member may comprise a composite material comprising a matrix material and at least one reinforcing element.

The secondary member may comprise at least one reinforcing element. The secondary member may comprise a composite material comprising a matrix material and at least one reinforcing element.

Each reinforcing element may comprise, for example, a carbon fibre, a metallic strand or the like.

The matrix material of at least one of the heating element, the primary member and the secondary member may comprise a polymer. The matrix material of at least one of the heating element, the primary member and the secondary member may comprise a material such as polyether ether ketone (PEEK), polyaryl ether ketone (PAEK), polyvinylidene diflouride (PVDF), polyphenylene sulphide (PPS) or the like.

The matrix material of the primary member, the secondary member and the heating element may be same matrix material.

The primary and/or secondary members may comprise a metal such as steel, aluminium or the like.

A method for terminating a fluid conduit is described herein, comprising:

providing a heating element with one of a fluid conduit and a component, the heating element comprising an electrically insulating matrix material and an electrically conductive reinforcing element extending through the matrix material;

bringing the other of the fluid conduit and the component and the heating element into engagement; and controlling a flow of electrical current in the reinforcing element so as to resistively heat and fuse at least some of the matrix material of the heating element with a matrix material of the other of the fluid conduit and the component.

The fluid conduit may define a generally cylindrical outer surface. The fluid conduit may define a through hole. The through hole may define an inner surface and inner diameter of the fluid conduit. The fluid conduit may define an outer surface and an outer diameter.

The fluid conduit may define a generally cylindrical surface such as a generally cylindrical outer surface.

The fluid conduit may define a tapered surface profile such as a tapered outer surface profile.

The fluid conduit may define a surface which increases in diameter towards an end of the fluid conduit.

The fluid conduit may define an outer surface which increases in diameter towards an end of the fluid conduit.

The fluid conduit may define a surface which decreases in diameter towards an end of the fluid conduit.

The fluid conduit may define an outer surface which decreases in diameter towards an end of the fluid conduit.

The component may define a through hole. The through hole may define an inner diameter of the component. The inner diameter of the component may be substantially similar to the outer diameter of the fluid conduit. This may facilitate an easier joining process. The component may be generally annular. The component may define a tapered surface profile such as a tapered outer surface profile. The component may comprise an annular wedge.

The fluid conduit and the component may be complementary in shape.

The fluid conduit and the component may have complementary surfaces.

The fluid conduit and the component may be configured to fit on, against or around one another.

The component may be configured to fit on, against or around a surface of the fluid conduit.

The component may be configured to fit on, against or around an outer surface of the fluid conduit.

The component may define a tapered surface profile such as a tapered outer surface profile.

The component may define a surface which increases in diameter towards an end of the component.

The component may define an inner surface which increases in diameter towards an end of the component.

The component may define a surface which decreases in diameter towards an end of the component.

The component may define an inner surface which decreases in diameter towards an end of the component.

The component may be configured to fit on, against or around an inner surface of the fluid conduit.

The method may comprise forming and/or shaping the fluid conduit or the component. The method may comprise forming and/or shaping the fluid conduit or the component by a machining process, for example, by turning or grinding. The method may comprise forming and/or shaping the fluid conduit or the component by thermoforming. Forming and/or shaping the fluid conduit or the component may provide an improved fit between the fluid conduit and a connector device or may provide an improved fit between the component and a connector device. Forming and/or shaping the fluid conduit or the component may reduce any mismatch in tolerances between a surface of the fluid conduit and a complementary surface of the connector device or may reduce any mismatch in tolerances between a surface of the component and a complementary surface of a connector device.

The component may comprise a portion of an annular wedge.

The component may define a slot. The slot may be aligned generally parallel to a longitudinal axis of the component.

The slot may extend through the component. For example, the slot may extend through a wall of the component.

The slot may extend part way through the component. For example, the slot may extend part way through a wall of the component.

The slot may extend part way along a length of the component. The slot may extend along the whole length of the component.

The component may define a plurality of slots.

Each slot may be aligned generally parallel to a longitudinal axis of the component.

Each slot may extend through the component. For example, each slot may extend through a wall of the component.

Each slot may extend part way through the component. For example, each slot may extend part way through a wall of the component.

Each slot may extend part way along a length of the component. Each slot may extend along the whole length of the component.

Different slots may have the same longitudinal extent. Different slots may have different longitudinal extents.

Each slot may extend from one end of the component towards the other end of the component. Different slots may extend from different ends of the component. For example, adjacent slots may extend from different ends of the component.

Different slots may extend from different ends of the component so that different slots overlap in longitudinal extent in a central section of the component. For example, adjacent slots may extend from different ends of the component so that the adjacent slots overlap in longitudinal extent in a central section of the component. Each slot may extend from the centre of the component towards one or both ends of the component.

The plurality of slots may be distributed circumferentially about the component. For example, the plurality of slots may have a uniform circumferential distribution about the component. The plurality of slots may allow the component and the heating element to be brought into closer engagement and/or to improve the uniformity of contact between the component and the heating element. More specifically, the plurality of slots may reduce the circumferential stiffness or strength of the component to allow the component to conform to, or comply with, the heating element when the component and the heating element are compressed together. The plurality of slots may reduce the circumferential stiffness or strength of a section of the component to allow the section of the component to conform to, or comply with, the heating element when the component and the heating element are compressed together. The plurality of slots may reduce the circumferential stiffness or strength of the component to allow an inner surface of the component to comply with an outer surface of the heating element when the component and the heating element are compressed together. The plurality of slots may reduce the circumferential stiffness or strength of the component to allow an outer surface of the component to comply with an inner surface of the heating element when the component and the heating element are compressed together.

The method may comprise:

bringing a plurality of components and the heating element into engagement; and controlling a flow of electrical current in the reinforcing element so as to resistively heat and fuse at least some of the matrix material of the heating element with a matrix material of each of the components.

Each component may comprise a different portion of an annular wedge.

The method may comprise joining a plurality of heating elements with the fluid conduit or the component, each heating element comprising an electrically insulating matrix material and an electrically conductive reinforcing element extending through the matrix material.

The method may comprise bringing the fluid conduit or the component and each heating element into engagement.

The method may comprise controlling a flow of electrical current in the reinforcing element of each heating element so as to resistively heat and fuse at least some of the matrix material of each heating element with a matrix material of the fluid conduit and/or the component.

The number of heating elements may be equal to the number of components.

The method may comprise bringing each component and each heating element into engagement.

Each heating element may be shaped to fit onto a surface of an annular wedge. Each heating element may be shaped to fit onto an inner surface of an annular wedge.

The method may facilitate the subsequent connection of a further member such as a further fluid conduit to the fluid conduit. For example, a connection device such as a collar, sleeve or the like may be fitted around and engage a surface of the component for connection of the fluid conduit and the further member. The connection device may engage or be connected to the further member for this purpose. Such a method may be used, for example, to terminate the fluid conduit in preparation for connection to a further fluid conduit. The method may comprise forming an annular recess in the end-face of the fluid conduit. The annular recess may define a primary annular end portion of the fluid conduit radially inwardly of the annular recess and a secondary annular end portion of the fluid conduit radially outwardly of the annular recess.

The method may comprise forming the annular recess at one end of a generally cylindrical interface between an inner layer of the fluid conduit and an adjacent layer of the fluid conduit.

The method may comprise forming the annular recess with an outwardly flared profile.

The method may comprise inserting a further heating element into the annular recess. The further heating element may be configured for insertion into the annular recess. The further heating element may be configured for engaging the primary and/or secondary annular end portions of the fluid conduit. The further heating element may be thin-walled. The further heating element may define a conical surface for engaging a flared surface of the annular recess.

The further heating element may be provided initially in generally planar form and subsequently shaped to fit in the annular recess. The further heating element may, for example, be shaped into a cylindrical or frusto-conical shape.

The method may comprise inserting a moulding tool into the through bore of the fluid conduit. The method may comprise heating the moulding tool before or during insertion into the through bore of the fluid conduit. The moulding tool may be heated by any appropriate means, for example contact with a heat source such as a flame, heated air or the like. The method may comprise inserting a moulding tool into the through bore of the fluid conduit adjacent the primary end portion. The moulding tool may be conical or frusto-conical in shape, or have a conically or frusto-conically shaped section. The method may comprise applying a force to the moulding tool such that it impacts upon the primary end portion of the fluid conduit. The method may comprise maintaining the application of force on the moulding tool such that the primary end portion of the fluid conduit deforms. The method may comprise forcing the moulding tool against the primary annular end portion of the fluid conduit so as to deform the primary annular end portion of the fluid conduit into engagement with the further heating element. The method may comprise forcing the moulding tool against the primary annular end portion of the fluid conduit so as to bring the primary and secondary annular end portions of the fluid conduit into engagement with the further heating element.

The method may comprise maintaining the application of force on the moulding tool such that the primary end portion of the fluid conduit deforms into the annular recess. The method may comprise maintaining the application of force on the moulding tool such that the primary end portion deforms into the annular recess so as to close the annular recess. The method may comprise maintaining the application of force on the moulding tool such that the primary end portion deforms into the annular recess. The closed annular recess may have the effect of producing a flared end section of the fluid conduit.

The method may comprise driving current through the further heating element such that the current heats a portion of the fluid conduit adjacent the annular recess. The method may comprise driving current through the further heating element such that it heats the primary and secondary end portions of the fluid conduit. The method may comprise heating the primary and secondary end portions of the fluid conduit over a period of time such that the heat is able to penetrate the material of the fluid conduit. The method may comprise heating the primary and secondary end portions of the fluid conduit over a period of time such that the material of the fluid conduit adjacent to the annular recess becomes soft and/or pliable.

The method may comprise a drying process. The method may comprise drying the fluid conduit before it is heated. Drying of the fluid conduit may assist in the heating process. Drying of the fluid conduit may assist in permitting heat to propagate more quickly through the fluid conduit. Drying of the fluid conduit may permit better functioning of the further heating element.

The fluid conduit may comprise at least one reinforcing element. The fluid conduit may comprise a composite material comprising a matrix material and at least one reinforcing element.

The component may comprise at least one reinforcing element. The component may comprise a composite material comprising a matrix material and at least one reinforcing element.

Each reinforcing element may comprise, for example, a carbon fibre, a metallic strand or the like.

The matrix material of at least one of the heating element, the fluid conduit and the component may comprise a polymer. The matrix material of at least one of the heating element, the fluid conduit and the component may comprise a material such as polyether ether ketone (PEEK), polyaryl ether ketone (PAEK), polyvinylidene diflouride (PVDF), polyphenylene sulphide (PPS) or the like.

The matrix material of the fluid conduit, the component and the heating element may be same matrix material.

The fluid conduit and/or the component may comprise a metal such as steel, aluminium or the like.

A terminated fluid conduit is described herein, comprising:
a fluid conduit joined with a heating element, the heating element comprising an electrically insulating matrix material and an electrically conductive reinforcing element extending through the matrix material; and
a separately formed component comprising a matrix material,
wherein the matrix material of the heating element is fused with the matrix material of the component.

A heating method is described herein, comprising:
providing a heating element, the heating element including a plurality of electrically conductive reinforcing elements extending through an electrically insulating matrix material so as to define a plurality of regions of convergence, wherein at least two reinforcing elements converge at each region of convergence; and
independently establishing electrical currents through the reinforcing elements corresponding to each of two or more regions of convergence.

The heating element may be configured such that at least two reinforcing elements overlap and/or engage one another at each region of convergence.

The method may comprise establishing an electrical current through the reinforcing elements so as to generate heat. Heat may be generated within the reinforcing elements by way of resistive heating.

The method may comprise attaching an electrical source to the reinforcing elements. The method may comprise using the electrical source to drive the electrical currents through the reinforcing elements. The flow of electrical current in the reinforcing element may be either alternating (AC) or direct (DC).

The method may comprise establishing an electrical current through the reinforcing elements corresponding to a first region of convergence more frequently than establishing an electrical current through the reinforcing elements corresponding to a second region of convergence. Driving an electrical current through reinforcing elements corresponding to a first region of convergence more frequently than driving an electrical current through reinforcing elements corresponding to a second region of convergence may result in more frequent and/or an increased level of heating of the first region of convergence compared to the second region of convergence.

The first region of convergence may correspond to a region of the heating element where a higher level of heat production is required. For example, the first region of convergence may correspond to a region of the heating element which cools more quickly and where a higher level of heat production is required to provide a more uniform temperature distribution across the heating element.

The method may comprise establishing an electrical current through the reinforcing elements corresponding to a first region of convergence less frequently than establishing an electrical current through the reinforcing elements corresponding to a second region of convergence. Driving an electrical current through reinforcing elements corresponding to a first region of convergence less frequently than driving an electrical current through reinforcing elements corresponding to a second region of convergence may result in less frequent and/or a decreased level of heating of the first region of convergence compared to the second region of convergence.

The first region of convergence may correspond to a region of the heating element where a lower level of heat production is required. For example, the first region of convergence may correspond to a region of the heating element which cools more slowly and where a lower level of heat production is required to provide a more uniform temperature distribution across the heating element.

The method may comprise connecting each reinforcing element to an electrical source. The method may comprise using the electrical source to control the flow of electrical current through each reinforcing element.

The method may comprise connecting different reinforcing elements to the electrical source at different times. The method may comprise using the electrical source to drive the electrical current through different reinforcing elements at different times.

Driving the electrical current through different reinforcing elements at different times may allow for heating of the matrix material of the heating element in selected regions.

The method may comprise providing one or more composite tapes, each composite tape comprising at least one of the reinforcing elements.

The method may comprise providing a plurality of composite tapes, each composite tape comprising at least one of the reinforcing elements.

The method may comprise connecting the reinforcing elements of different composite tapes to the electrical source at different times. The method may comprise using the electrical source to drive the electrical current through the reinforcing elements of different composite tapes at different times.

The method may comprise connecting a pair of composite tapes to the electrical source more frequently than the other composite tapes. The method may comprise using the electrical source to drive the electrical current through the pair of composite tapes more frequently than the other composite tapes. Such a method may increase the degree of heating of the matrix material in a region of convergence of the pair of composite tapes where the pair of composite tapes converge towards one another, overlap and/or engage one another when compared with the degree of heating of the matrix material in a region of convergence defined by at least two different composite tapes.

The method may comprise connecting a pair of composite tapes to the electrical source less frequently than the other composite tapes. The method may comprise using the electrical source to drive the electrical current through the pair of composite tapes less frequently than the other composite tapes. Such a method may decrease the degree of heating of the matrix material in a region of convergence of the pair of composite tapes where the pair of composite tapes converge towards one another, overlap and/or engage one another when compared with the degree of heating of the matrix material in a region of convergence defined by at least two different composite tapes.

The method may comprise controlling the distribution and/or density of the reinforcing elements in the heating element for selective heating. For example, the method may comprise increasing a density of the reinforcing elements and/or a density of regions of convergence of the reinforcing elements in a selected area of the heating element. Such an arrangement of the reinforcing elements may allow more heat to be generated in the selected area of the heating element. This may provide a more uniform temperature distribution across the matrix material of the heating element during resistive heating.

The method may comprise connecting different reinforcing elements to the electrical source at the same time. The method may comprise using the electrical source to drive the electrical current through different reinforcing elements at the same time.

The method may comprise connecting each reinforcing element to the electrical source at a point of protrusion from the matrix material.

The method may comprise removing a portion of the electrically insulating matrix material from the heating element. This may serve to expose the reinforcing element or may increase a length of the reinforcing element exposed to allow an electrical connection to be made thereto.

The method may comprise removing matrix material from the heating element by any appropriate means, for example by burning or melting the matrix material, by machining the matrix material, or the like.

The method may comprise preparing the reinforcing element of the heating element before connecting the reinforcing element to the electrical source. The method may comprise preparing the reinforcing element so as to remove any electrically insulating matrix material that remains on the reinforcing element. The method may comprise scrubbing and/or heating the reinforcing element before connecting the reinforcing element to the electrical source. The method may comprise applying a surface material to the reinforcing element. Applying the surface material may facilitate or enhance the subsequent electrical connection to the electrical source. The surface material may be electrically conductive. The surface material may, for example be silver paint. The method may comprise applying the surface material by any appropriate method, for example, spraying, painting or the like.

Controlling the flow of electrical current in the reinforcing element may comprise controlling the flow of electrical current so as to increase a temperature of the heating element to a desired temperature.

Controlling the flow of electrical current in the reinforcing element may comprise inducing an electrical current in the reinforcing element, for example, by exposing the reinforcing element to a time-varying magnetic field.

The method may comprise independently establishing electrical currents through the reinforcing elements corresponding to different regions of convergence at different times.

The method may comprise controlling the electrical currents through the reinforcing elements so as to melt the matrix material of the heating element.

The method may comprise bringing a member and the heating element into engagement. Such a method may allow heat to be transferred from the heating element to the member.

The method may comprise attaching the member and the heating element.

The method may comprise controlling the electrical currents through the reinforcing elements so as to cool and solidify the melted matrix material of the heating element.

The method may comprise controlling the electrical currents through the reinforcing elements so as to fuse the matrix material of the heating element with a matrix material of the member.

The method may comprise compressing the heating element and the member together.

The method may comprise bonding, for example chemically bonding the member and the heating element. The heating element may be attached by means of a glue or resin, for example polyester or epoxy resin.

A heating element is described herein, comprising:
a plurality of electrically conductive reinforcing elements extending through electrically insulating matrix material so as to define a plurality of regions of convergence, wherein at least two reinforcing elements converge at each region of convergence, and
wherein the reinforcing elements are configured to permit electrical currents to be independently established through the reinforcing elements corresponding to each of two or more regions of convergence.

The heating element may be configured such that at least two reinforcing elements overlap and/or engage one another at each region of convergence.

The heating element may comprise first and second layers of matrix material, and a layer of composite material between the first and second layers of matrix material.

The heating element may comprise a substrate.

The first layer of matrix material may be formed on or around the substrate. The layer of composite material may be formed on the first layer of matrix material. The second layer of matrix material may be formed on or around the layer of composite material.

Each of the first and second layers of matrix material may be formed from one or more layers of matrix tape. The matrix tape may be wrapped or wound on or around the substrate one or more times. Different layers of matrix tape may be wrapped or wound on or around the substrate at the same angle or at different angles relative to a longitudinal axis of the first member. The different angles may have different magnitudes and/or signs relative to a longitudinal axis of the substrate. The different angles may have the same magnitude but different signs relative to the longitudinal axis of the substrate.

The layer of composite material may be formed from one or more layers of composite tape. The reinforcing elements may be generally aligned along a length of the composite tape. The composite tape may comprise a plurality of reinforcing elements. Each of the reinforcing elements may be generally aligned along a length of the composite tape. The reinforcing elements may be electrically isolated from one another by the matrix material. Different layers of composite tape may be wrapped or wound at the same angle or at different angles relative to a longitudinal axis of the substrate.

The layer of composite material may be formed from a plurality of composite tapes. Each composite tape may be wrapped or wound on or around the substrate so as to form one or more layers of composite tape. Each composite tape may comprise one or more reinforcing elements. Each reinforcing element may be wrapped or wound over itself. Each reinforcing element may be wrapped or wound over one or more of the reinforcing elements of the other composite tapes.

The layer of composite material may be formed from a single continuous length of composite tape wrapped or wound on or around the substrate so as to form the layer of composite material. Each reinforcing element within the single continuous length of composite tape may provide a corresponding continuous electrical current path. Each reinforcing element may be present within one or more composite tape layers. Each reinforcing element may be wrapped or wound over itself.

Each reinforcing element may comprise, for example, a carbon fibre, a metallic strand or the like.

The matrix material of at least one of the heating element, the fluid conduit and the component may comprise a polymer. The matrix material of at least one of the heating element, the fluid conduit and the component may comprise a material such as polyether ether ketone (PEEK), polyaryl ether ketone (PAEK), polyvinylidene diflouride (PVDF), polyphenylene sulphide (PPS) or the like.

The matrix material of the fluid conduit, the component and the heating element may be same matrix material.

The fluid conduit and/or the component may comprise a metal such as steel, aluminium or the like.

A heating system is described herein, comprising:

a heating element, including a plurality of electrically conductive reinforcing elements extending through an electrically insulating matrix material so as to define a plurality of regions of convergence, wherein at least two reinforcing elements converge at each region of convergence; and an electrical source, wherein the electrical source is electrically connected to the reinforcing elements and the reinforcing elements are configured to permit electrical currents to be independently established through the reinforcing elements corresponding to each of two or more regions of convergence.

The electrical source may be electrically connected to both ends of each reinforcing element.

The system may comprise one or more electrical conductors such as one or more cables, wires or the like which connect the electrical source to the reinforcing elements.

The system may comprise one or more clamps, terminals, junctions or the like to electrically connect the one or more electrical conductors to the reinforcing elements.

The electrical conductors may be electrically connected to the reinforcing elements by electrically conductive epoxy or by soldering or the like.

Each reinforcing element may protrude at either end from the electrically insulating matrix material.

Both ends of each reinforcing element may be coated with an electrically conductive material such as an electrically conductive paint or paste, for example silver paint, to improve the electrical conductivity of the electrical connection to the electrical source.

BRIEF DESCRIPTION OF DRAWINGS

Methods and apparatus will now be further described with reference to the following drawings of which:

FIG. 14 is longitudinal cross-section of an end portion of a first alternative composite fluid conduit arrangement;

FIG. 15 is a longitudinal cross-section of an end portion of a second alternative composite fluid conduit arrangement;

FIG. 16(a) is a longitudinal cross-section of an end portion of a third alternative composite fluid conduit arrangement;

FIG. 16(b) is an end view of the third alternative composite fluid conduit arrangement of FIG. 16(a);

FIG. 17(a) is an end view of a fourth alternative composite fluid conduit arrangement;

FIG. 17(b) is a longitudinal cross-section on AA of an end portion of the fourth alternative composite fluid conduit arrangement of FIG. 17(a); and FIG. 17(c) is a longitudinal cross-section on BB of an end portion of the fourth alternative composite fluid conduit arrangement of FIG. 17(a).

DETAILED DESCRIPTION OF DRAWINGS

Figure 1:
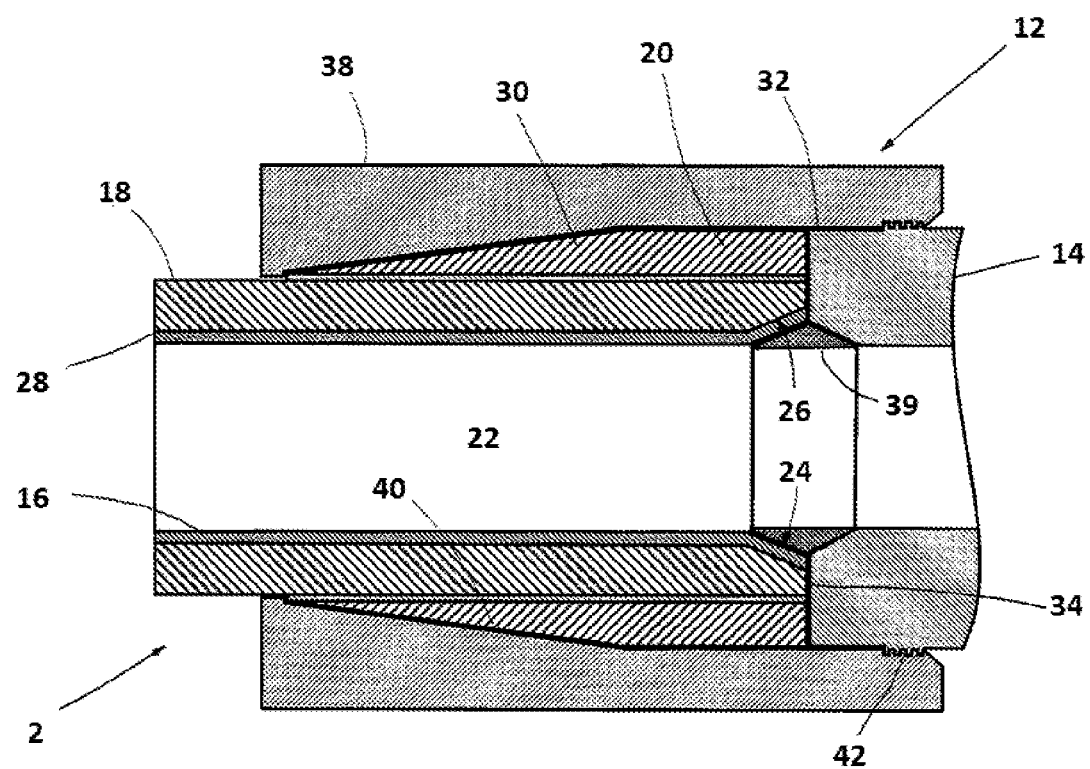
FIG. 1 is a longitudinal cross-section of an assembly comprising a terminated composite fluid conduit engaged with a tubular member.

FIG. 1 is a cross sectional view of an end portion of an assembly 1 comprising a terminated composite fluid conduit 2 engaged with a tubular member 14. The terminated composite fluid conduit 2 comprises a primary member in the form of a composite fluid conduit 10 and a secondary member in the form of a generally annular composite wedge 20 attached to an outer surface of the fluid conduit 10.

The fluid conduit 10 comprises an inner layer 16 and an outer layer 18. The inner layer 16 is formed from an electrically insulating polyether either ketone (PEEK) matrix material. The outer layer 18 is formed from a composite material comprising reinforcing elements in the form of carbon fibres embedded in a PEEK matrix material. The inner and outer layers 16, 18 define at interface 28 therebetween. The inner layer 16 defines a through bore 22.

The inner and outer layers 16, 18 comprise flared end sections 24, 26 respectively. The flared end section 24 has the effect of gradually increasing the inner and outer diameters of the inner layer 16 as it approaches an end face 34 of the fluid conduit 10. The flared end section 26 has the effect of gradually increasing the inner diameter of the outer layer 18 as it approaches the end face 34 of the fluid conduit 10. The rate of increase of diameter of the flared end section 24 is the same or substantially similar to the rate of increase of diameter of the flared end section 26. The tubular member 14 comprises a corresponding flared section 25 comprising a rate of decrease of diameter. The rate of decrease of diameter of flared section 25 may be similar in magnitude to the rate of increase of diameter of flared sections 24, 26.

The composite wedge 20 comprises a PEEK carbon fibre composite material. Although not shown explicitly in FIG. 1, it should be understood that the composite wedge 20 may comprise an inner PEEK layer and an outer carbon fibre PEEK layer. The wedge 20 comprises a frusto-conical portion 30 and a generally cylindrical portion 32. The generally cylindrical portion 32 is located towards the end face 34 of the fluid conduit 10, while the frusto-conical portion 30 is located further from the end face 34 of the fluid conduit 10.

The terminated fluid conduit 2 further comprises a generally tubular heating element 36 located between the outer layer 18 of the fluid conduit 10 and the wedge 20. The heating element 36 is thin-walled and, as will be described in more detail below, is used to weld the outer layer 18 of the fluid conduit 10 and the wedge 20 together.

The assembly 1 comprises a connection device in the form of a collar member 12 which connects the terminated fluid conduit 2 to the tubular member 14 by engagement with both the tubular member 14 and the wedge 20. The collar member 12 defines an outer surface 38 and an inner surface 40. The outer surface 38 of the collar member 12 is generally cylindrical, while the inner surface 40 of the collar member 12 is shaped so as to complement the outer profile of the wedge 20. The collar member 12 comprises a threaded portion 42 for connection of the terminated fluid conduit 2 to a threaded portion of the tubular member 14.

The tubular member 14 defines a flared end section 25 at an end face thereof adjacent to the end face 34 of the fluid conduit 10.

The assembly 1 further comprises a seal member 39 located at the interface between the fluid conduit 10 and the tubular member 14. The seal member 39 is generally annular in shape and defines an outer surface which is complementary in shape to an inner surface of the flared end section 24 of the inner layer 16 of the fluid conduit 10 and which is complementary in shape to an inner surface of the flared end section 25 of the tubular member 14. The inner diameter of the seal member 39 is similar or substantially similar to the inner diameter of the inner layer 16 of the fluid conduit 10.

A method of forming the terminated fluid conduit 2 of FIG. 1 will now be described with reference to FIGS. 2(a)-11.

Figure 2A:
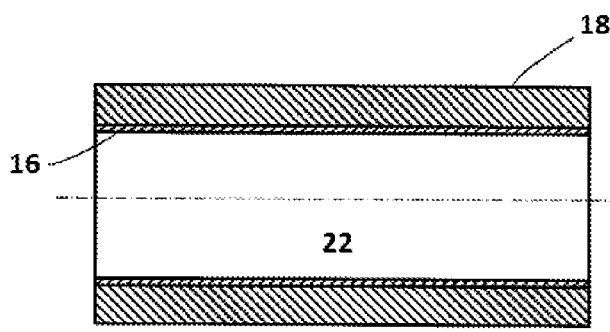
FIG. 2(a) is a longitudinal cross-section of an end portion of a composite fluid conduit before termination.
Figure 2B:
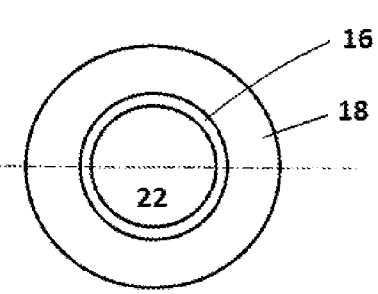
FIG. 2(b) is an end view of the fluid conduit of FIG. 2(a)

FIGS. 2(a) and 2(b) show the fluid conduit 10 before formation of the heating element 36.

Figure 3A:
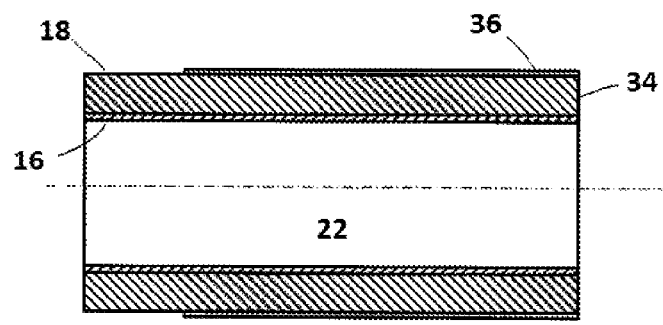
FIG. 3(a) is a longitudinal cross-section of the end portion of a composite fluid conduit arrangement comprising the composite fluid conduit of FIG. 2(a) and a heating element formed on an external surface of the composite fluid conduit.
Figure 3B:
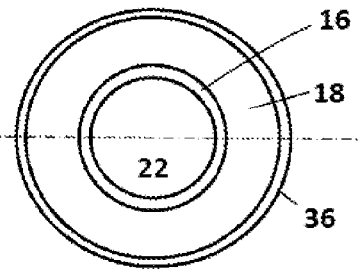
FIG. 3(b) is an end view of the composite fluid conduit arrangement of FIG. 3(a)

FIGS. 3(a) and 3(b) show the fluid conduit 10 after formation of the generally tubular heating element 36 directly onto the outer surface of the outer layer 18 of the fluid conduit 10. The heating element 36 is disposed such that one end of the heating element 36 is flush with the end face 34 of the fluid conduit 10.

Figure 4A:
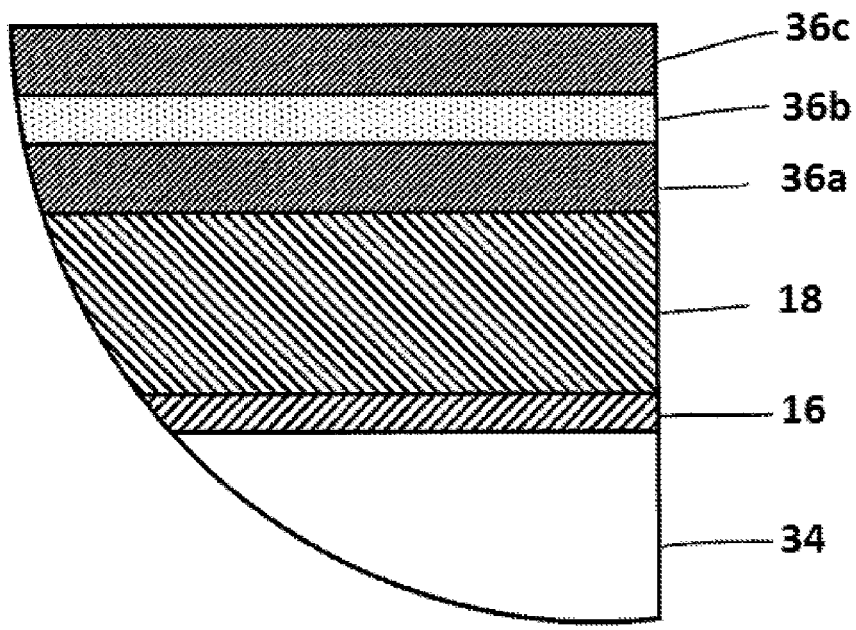
FIG. 4(a) shows a detail of the longitudinal cross-section of an end portion of the heating element of FIGS. 3(a) and 3(b)

As shown in FIG. 4(a), the heating element 36 comprises a first layer 36a of a PEEK matrix material formed on the outer surface of the outer layer 18 of the fluid conduit 10, a composite layer 36b comprising the PEEK matrix material and a plurality of electrically conductive carbon fibre reinforcing elements formed on top of the first layer 36a of matrix material, and a second layer 36c of the PEEK matrix material formed on top of the composite layer 36b.

The first layer 36a of PEEK matrix material is formed by wrapping or winding a length of PEEK tape (not shown) on the outer surface of the outer layer 18 of the fluid conduit 10.

Figure 4B:
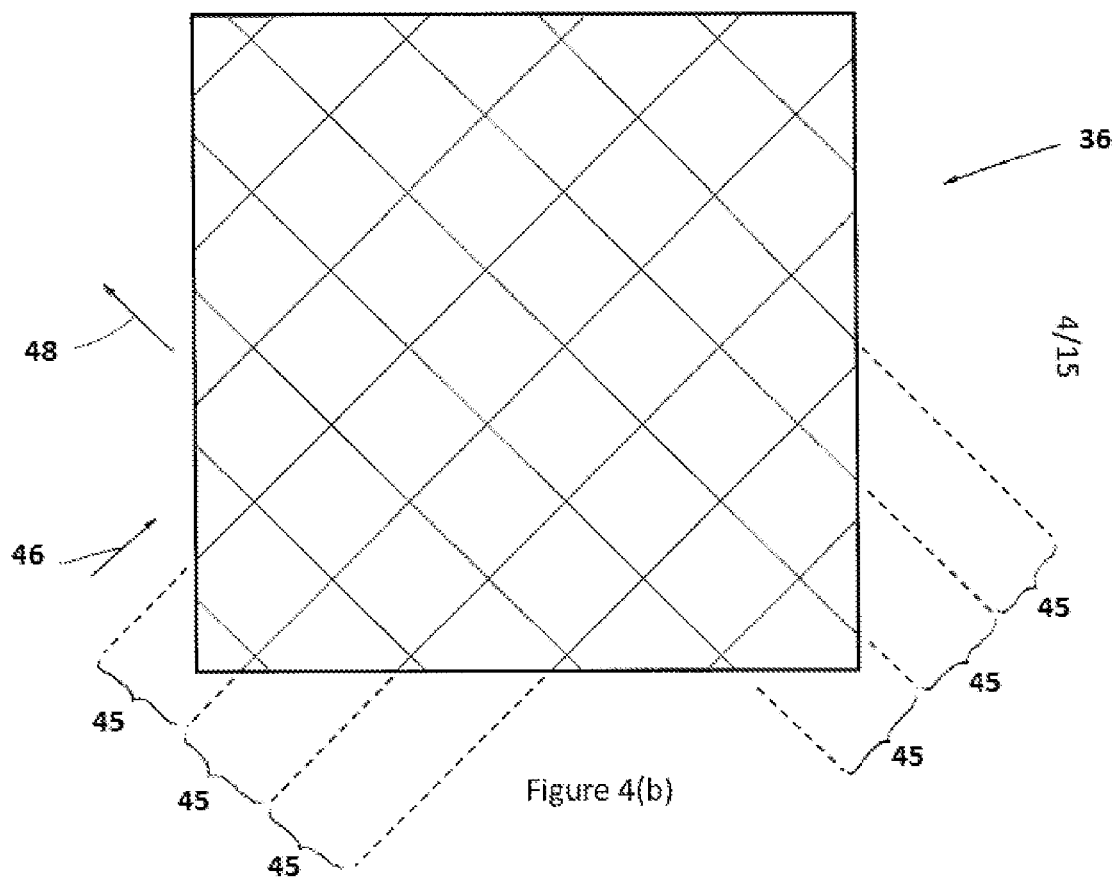
FIG. 4(b) shows the arrangement of composite tape in a region of the heating element of FIGS. 3(a) and 3(b)

As shown in FIG. 4(b), the composite layer 36b is formed by wrapping or winding a single continuous length of PEEK carbon fibre composite tape 45 on top of the first layer 36a of matrix material. Different layers of the composite tape 45 are wound along different directions, for example mutually perpendicular directions as illustrated by arrows 46 and 48 so as to form the composite layer 36b. It should be understood that, although the composite layer 36b of the heating element 36 is formed from a single continuous length of PEEK carbon fibre composite tape 45 such that each carbon fibre reinforcing element of the composite tape 45 extends continuously along the length of the composite tape 45, other composite tape arrangements are possible as will be described in more detail below with reference to FIGS. 12 and 13.

The second layer 36c of PEEK matrix material is formed by wrapping or winding a length of PEEK tape (not shown) on the outer surface of the composite layer 36b.

Figures 5A, 5B:
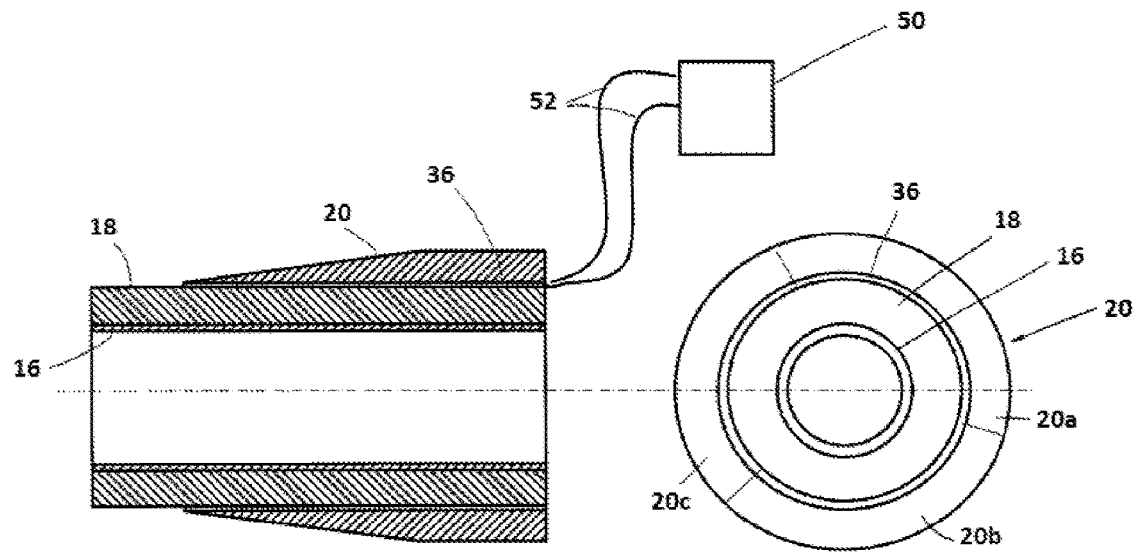
FIG. 5(a) is a longitudinal cross-section of the end portion of a composite fluid conduit arrangement during welding of build-up wedge components to the fluid conduit of FIGS. 2(a) and 2(b) using the heating element of FIGS. 4(a) and 4(b)
FIG. 5(b) is an end view of the fluid conduit arrangement of FIG. 5(a)

FIGS. 5(a) and 5(b) illustrates the welding of the annular PEEK carbon fibre wedge 20 to the fluid conduit 10. As shown in FIG. 5(b), the annular wedge 20 actually comprises three wedge portions 20a, 20b, 20c. Each of the three wedge portions 20a, 20b, 20c account for one third of the material of the annular wedge 20. Each of the three wedge portions 20a, 20b, 20c are the same or substantially similar in shape. The three wedge portions 20a, 20b, 20c are arranged around, and are held or pressed into engagement with, the heating element 36.

The ends of the carbon fibres of the composite tape 45 are exposed by burning off some of the PEEK matrix material adjacent to the ends of the composite tape 45, for example using a flame. An electrical conductive material in the form of silver paint is applied to the exposed ends of the carbon fibres. An electrical source 50 is connected to the painted ends of the carbon fibres using electrical conductors 52. Each electrical conductor 52 may, for example, have a clamp, a terminal or the like at one end to facilitate the electrical connection to the painted ends of the carbon fibres. Alternatively, the electrical conductors 52 may be electrically connected to the painted ends of the carbon fibres using an electrically conductive adhesive or by soldering or the like.

In use, the electrical source 50 drives an electrical current through the carbon fibres of the composite tape 45 causing resistive heating of the composite tape 45 until the PEEK matrix material of the heating element 36, the PEEK matrix material of the outer layer 18 of the fluid conduit 10 adjacent the heating element 36, and the PEEK matrix material of the wedge 20 adjacent to the heating element 36 melts. The electrical source 50 subsequently reduces or stops the flow of electrical current driven through the composite tape 45 causing the heating element 36 to cool and causing the PEEK matrix material of the heating element 36 to fuse or bond with the PEEK matrix material of the outer layer 18 of the fluid conduit 10 and with the PEEK matrix material of the wedge 20. The electrical source 50 may drive an alternating current (AC) or a direct current (DC) through the carbon fibres of the composite tape 45.

Figures 6A, 6B:
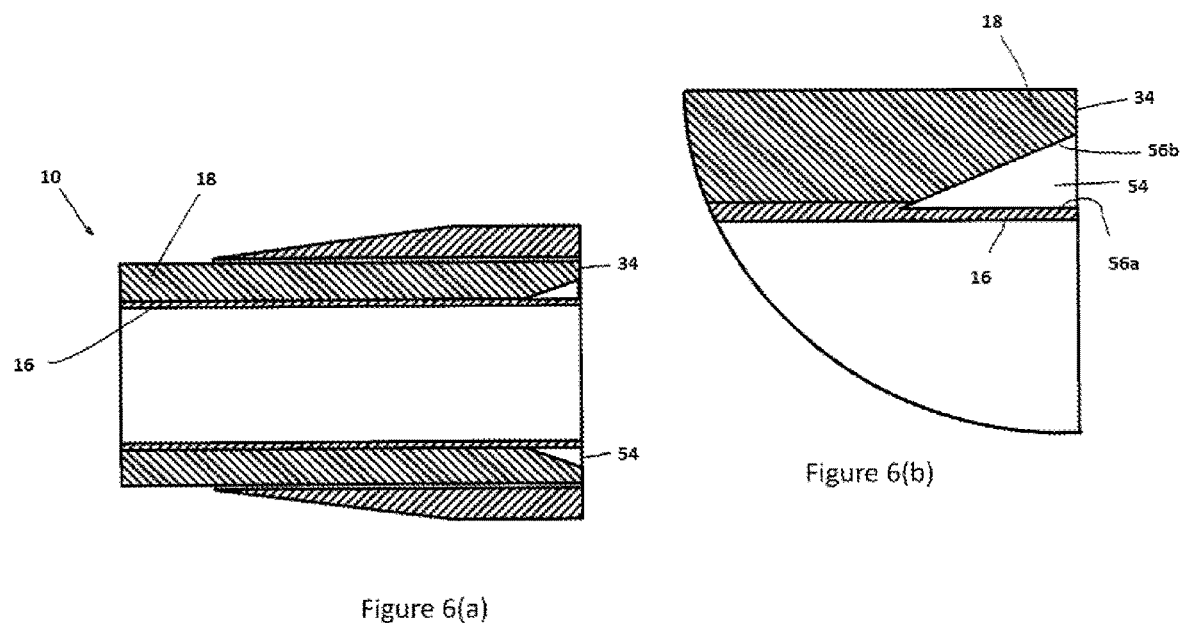
FIG. 6(a) is a longitudinal cross-section of the end portion of the composite fluid conduit arrangement of FIGS. 5(a) and 5(b) after formation of a recess in an end face of the composite fluid conduit arrangement.
FIG. 6(b) shows a detail of the longitudinal cross-section of the recess of FIG. 6(a)

As shown in FIG. 6(a), the method of forming the terminated fluid conduit 2 continues with the formation of an annular recess 54 in the end face 34 of the fluid conduit 10. The annular recess 54 is triangular in cross section. FIG. 6(b) illustrates a close-up view of the annular recess 54. The annular recess 54 is formed in the region of the interface 28 between the inner layer 16 and the outer layer 18 of the fluid conduit 10 so as to define a radially inner end portion 56a of the fluid conduit 10 and a radially outer end portion 56b of the fluid conduit 10. The annular recess 54 may be formed by any appropriate method, for example, by machining, melting or the like.

Figure 7:
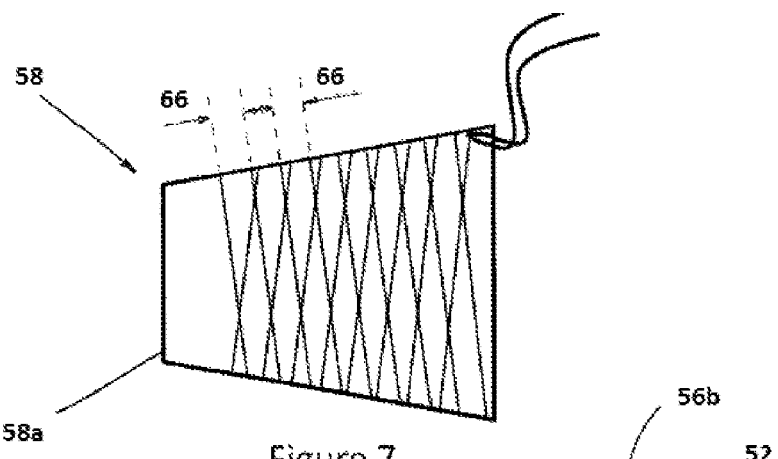
FIG. 7 is a side-elevation of a further heating element.

As will be described in more detail below, a further heating element 58 shown in FIG. 7 is used to weld the radially inner end portion 56a of the fluid conduit 10 and the radially outer end portion 56b of the fluid conduit 10 together. The further heating element 58 has a similar composite structure to the heating element 36. More specifically, the further heating element 58 comprises a frusto-conical PEEK substrate 58a, a PEEK carbon fibre composite layer formed on or around the PEEK substrate 58a and an outer PEEK layer formed around the composite PEEK carbon fibre composite layer. The PEEK carbon fibre composite layer is formed by wrapping or winding a single length of PEEK carbon fibre composite tape 66 on top of the PEEK substrate 58a. Different layers of the composite tape 66 are wound along different directions to form the PEEK carbon fibre composite layer. The outer PEEK layer is formed by wrapping or winding a length of PEEK tape (not shown) on the outer surface of the PEEK carbon fibre composite layer.

Figure 8:
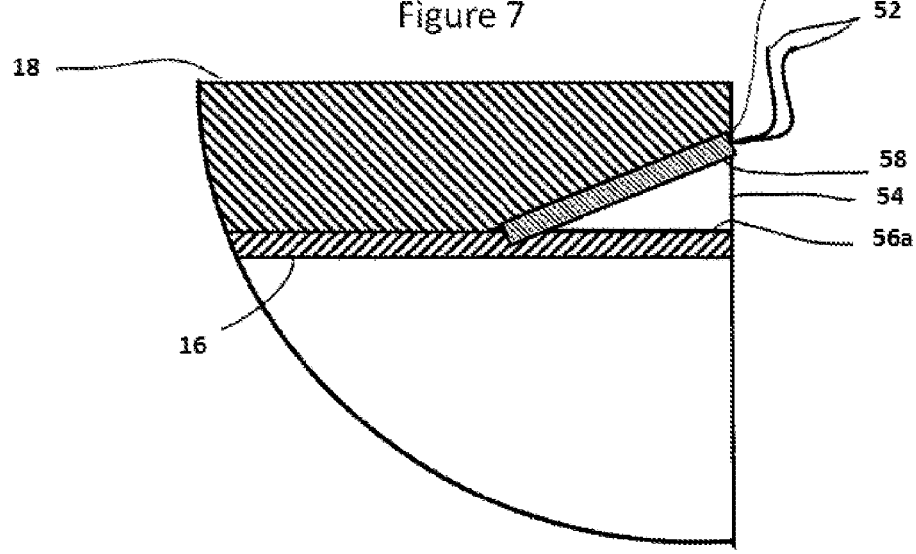
FIG. 8 is a longitudinal cross-section of the end portion of the composite fluid conduit arrangement of FIGS. 6(a) and 6(b) after insertion of the further heating element of FIG. 7 into the recess.

In the next step of the method shown in FIG. 8, the further heating element 58 is inserted into the annular recess 54 formed in the end face 34 of the fluid conduit 10. As shown in FIG. 8, the frusto-conical outer surface of the further heating element 58 is configured to engage an inner surface of the radially outer end portion 56b of the fluid conduit 10.

Figure 9:
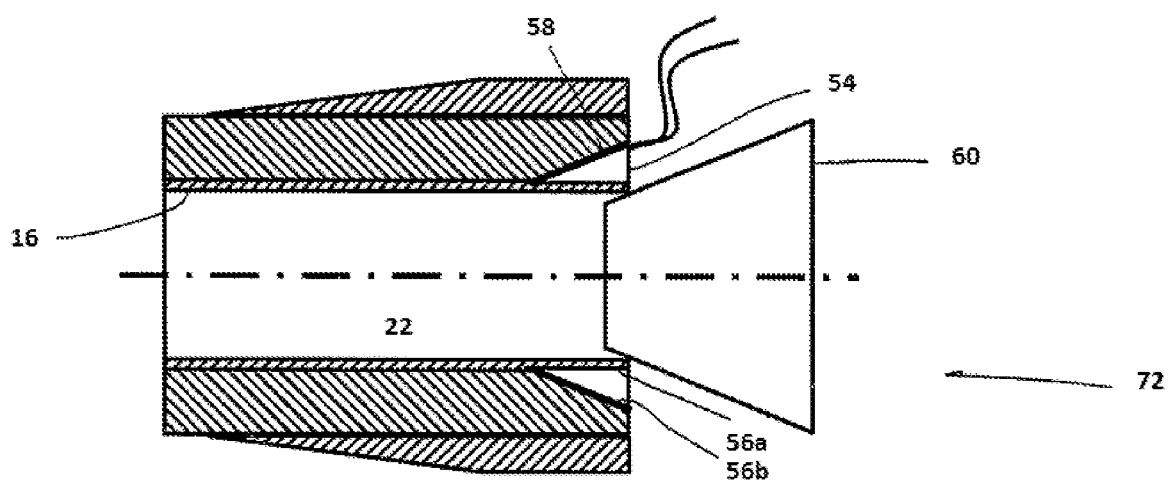
FIG. 9 is a longitudinal cross-section of the end portion of the composite fluid conduit arrangement and of a moulding tool.
Figure 10:
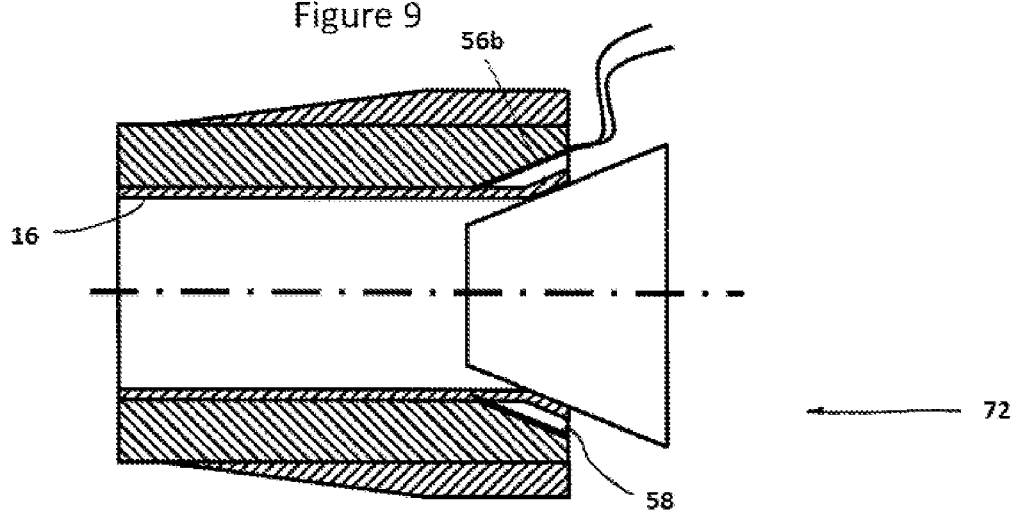
FIG. 10 is a longitudinal cross-section of the end portion of the composite fluid conduit arrangement during thermoforming of an inner end portion of the fluid conduit using the moulding tool.

As shown in FIGS. 9 and 10 the method continues with the thermoforming of the radially inner end portion 56a of the fluid conduit 10 using a moulding tool 60 inserted into the through bore 22 of the fluid conduit 10 at an end of the through bore 22 adjacent to the end face 34. Before insertion into through bore 22, the moulding tool 60 is heated, for example by a flame or heated air. A force in the direction of arrow 72 is applied to the moulding tool 60 so as to deform or splay the inner end portion 56a of the fluid conduit 10 radially outwardly as shown in FIG. 10 until the inner end portion 56a of the fluid conduit 10 engages a radially inner surface of the further heating element 58 as shown in FIG. 11.

Figure 11:
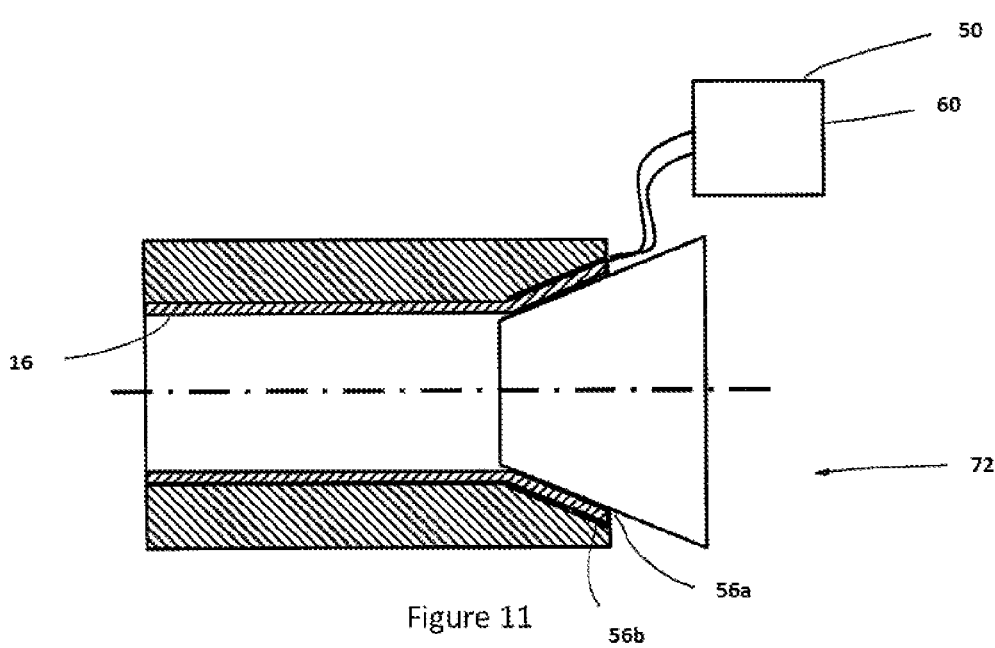
FIG. 11 is a longitudinal cross-section of the end portion of the composite fluid conduit arrangement during welding of the inner end portion of the fluid conduit to an outer end portion of the fluid conduit.

With the inner end portion 56a of the fluid conduit 10 in engagement with the radially inner surface of the further heating element 58 as shown in FIG. 11, the electrical source 50 is connected to the further heating element 58 by the electrical conductors 52. The electrical source 50 drives an electrical current through the carbon fibres of the composite tape 66 of the further heating element 58 to resistively heat and melt the PEEK matrix material of the further heating element 58 with the adjacent PEEK matrix material of the inner end portion 56a of the fluid conduit 10 and with the adjacent PEEK matrix material of the outer end portion 56b of the fluid conduit 10. The electrical source 50 subsequently reduces or discontinues the flow of the electrical current to permit the PEEK matrix material of the further heating element 58, the PEEK matrix material of the inner end portion 56a of the fluid conduit 10, and the PEEK matrix material of the outer end portion 56b of the fluid conduit 10 to solidify and fuse thereby bonding the inner end portion 56a of the fluid conduit 10 and the outer end portion 56b of the fluid conduit 10 to the further heating element 58.

Figure 12:
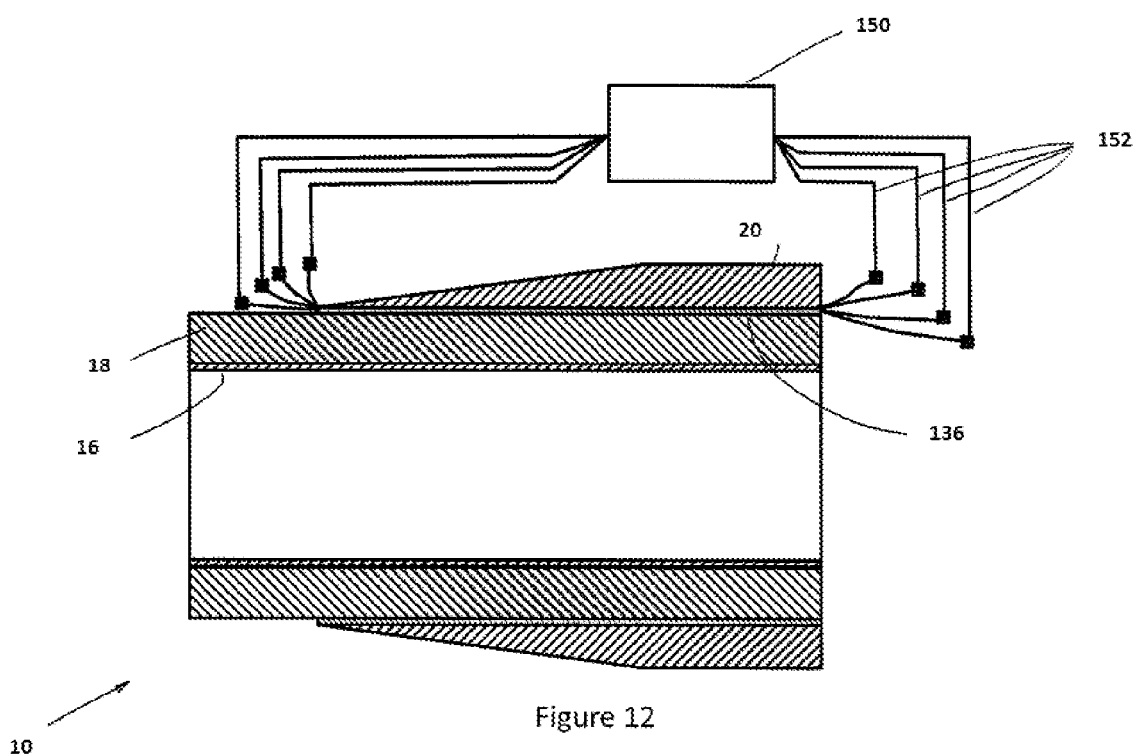
FIG. 12 is a longitudinal cross-section of an end portion of a composite fluid conduit arrangement during welding of build-up wedge components to a fluid conduit using an alternative heating element.

FIG. 12 illustrates an alternative method for welding the wedge portions 20a, 20b, 20c of the wedge 20 to the fluid conduit 10. As for the method described with reference to FIGS. 2(a) to 4(b), a generally tubular heating element 136 is formed in situ on the outer surface of the outer layer 18 of the fluid conduit 10.

Like the heating element 36 of FIGS. 4(a) and 4(b), the heating element 136 comprises a first layer of a PEEK matrix material formed on the outer surface of the outer layer 18 of the fluid conduit 10, a composite layer comprising the PEEK matrix material and a plurality of electrically conductive carbon fibre reinforcing elements formed on top of the first layer of PEEK matrix material, and a second layer of the PEEK matrix material formed on top of the composite layer.

Like the heating element 36 of FIGS. 4(a) and 4(b), the first layer of PEEK matrix material of the heating element 136 is formed by wrapping or winding a length of PEEK tape (not shown) on the outer surface of the outer layer 18 of the fluid conduit 10.

Figure 13:
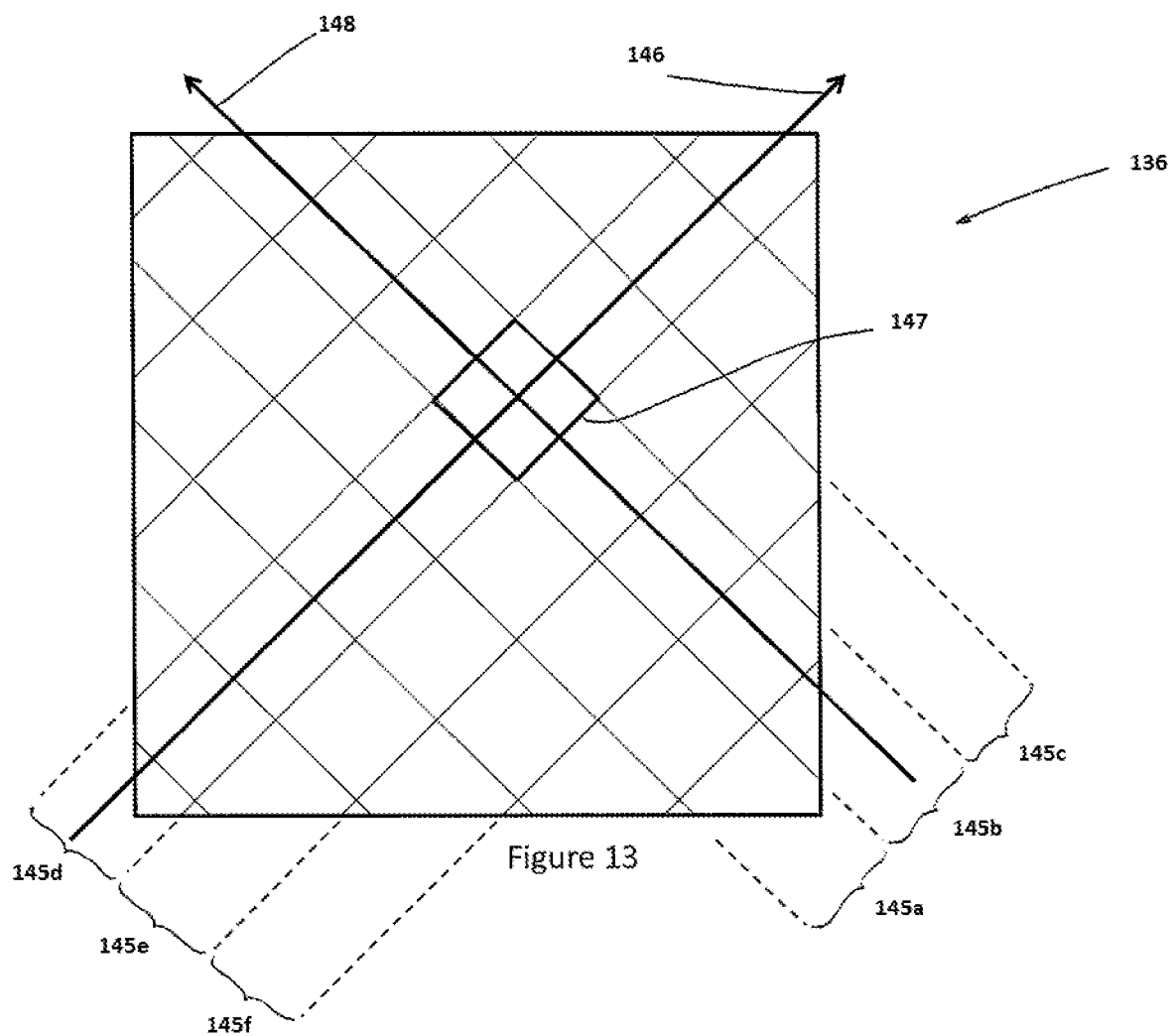
FIG. 13 shows the arrangement of different lengths of composite tape in a region of the alternative heating element of FIG. 12.

However, unlike the heating element 36 of FIGS. 4(a) and 4(b), the composite layer of the heating element 136 shown in FIG. 13 is formed by wrapping or winding separate electrically distinct PEEK carbon fibre composite tapes 145a, 145b, 145c, 145d, 145e, 145f on top of the first layer of PEEK matrix material. As shown in FIG. 13, some composite tapes 145a, 145b, 145c may be wound along one direction 146, whilst other composite tapes 145d, 145e, 145f may be wound along a different direction such as a perpendicular direction 148 so that each composite tape 145a, 145b, 145c, 145d, 145e, 145f may overlap one or more of the other composite tapes in a plurality of overlapping regions. It should be understood that the carbon fibres of each composite tape 145a, 145b, 145c, 145d, 145e, 145f may converge, overlap and/or engage with the carbon fibres of one or more of the other composite tapes in each overlapping region. As such, each overlapping region may be considered to be a region of convergence of the carbon fibres of at least two different composite tapes. Like the heating element 36 of FIGS. 4(a) and 4(b), the second layer of PEEK matrix material of the heating element 136 is formed by wrapping or winding a length of PEEK tape (not shown) on the outer surface of the PEEK carbon fibre composite layer.

With reference to FIG. 12, an electrical source 150 is connected to the heating element 136 by electrical conductors 152. More specifically, both ends of each composite tape 145a, 145b, 145c, 145d, 145e, 145f are connected to the electrical source 150 by a corresponding pair of electrical conductors 152. The electrical source 150 is configured to drive an electrical current through each composite tape 145a, 145b, 145c, 145d, 145e, 145f independently of the other composite tapes. The electrical source 150 may, for example, comprise a switch or demultiplexer arrangement (not shown) for this purpose. This may permit different regions of the heating element to be heated differently. For example, with reference to FIG. 13, driving an electrical current through composite tapes 145b and 145d more frequently than driving an electrical current through the other composite tapes 145a, 145c, 145e, and 145f may result in greater resistive heating in the vicinity of composite tapes 145b and 145d and, in particular, may result in greater resistive heating in a region of overlap 147 of the composite tapes 145b and 145d. Accordingly, the heating element 136 may allow a greater degree of heating in selected areas of the heating element 136 such as those areas of the heating element 136 which cool most rapidly. In particular, the electrical source 150 may be operated so as to preferentially heat an annular region of the heating element 136 which is located generally midway axially between the ends of the wedge 20. This may provide a more uniform temperature distribution during welding and may result in a more uniform bond between the heating element 136 and both the wedge 20 and the fluid conduit 10. The electrical source 150 may drive an alternating current (AC) or a direct current (DC) through the carbon fibres of the composite tapes 145a, 145b, 145c, 145d, 145e, 145f. Without wishing to be bound by theory, it is thought that driving AC through the carbon fibres of one tape may induce the flow of AC in the flow of carbon fibres in a different adjacent tape. In particular, it is thought that driving AC through the carbon fibres of one tape may induce the flow of AC in the flow of carbon fibres in a region of overlap of the one tape with a different tape in a previous or a subsequent layer of composite tape.

One of ordinary skill in the art will appreciate that various modifications may be made to the foregoing apparatus and methods. For example, with reference to the heating element 136, the electrical source 150 may be configured to drive an electrical current through two or more of the composite tapes 145a, 145b, 145c, 145d, 145e, 145f at the same time. In other variants, the heating element may include or incorporate a temperature sensor such as a Fibre Bragg Grating (FBG), a resistance temperature detector (RTD), a thermistor, a thermocouple or the like. Incorporating a temperature sensor into the heating element may allow greater control over the heating process. This may, for example, allow greater control over the temperature and/or the temperature distribution. This may, in turn, allow greater control over the welding process leading to improved weld strength.

FIG. 14 shows a first alternative fluid conduit arrangement comprising a composite fluid conduit 210 and a composite annular wedge 220 after welding of the composite annular wedge 220 to the composite fluid conduit 210. The fluid conduit 210 comprises a PEEK inner layer 216 and a PEEK carbon fibre outer layer 218. The composite annular wedge 220 comprises a PEEK carbon fibre composite material. For example, the composite annular wedge 220 may comprise a PEEK inner layer and a PEEK carbon fibre outer layer. Unlike the composite fluid conduit arrangement of FIGS. 5(a) and 5(b), however, the fluid conduit 210 defines a tapered outer surface having a diameter which decreases towards an end face of the fluid conduit 210 and the annular wedge 220 defines a complementary tapered inner surface having a diameter which decreases towards the end of fluid conduit 210.

FIG. 15 shows a second alternative fluid conduit arrangement comprising a composite fluid conduit 310 and a composite annular wedge 320 after welding of the composite annular wedge 320 to the composite fluid conduit 310. The fluid conduit 310 comprises a PEEK inner layer 316 and a PEEK carbon fibre outer layer 318. The composite annular wedge 320 comprises a PEEK carbon fibre composite material. For example, the composite annular wedge 320 may comprise a PEEK inner layer and a PEEK carbon fibre outer layer. Unlike the composite fluid conduit arrangement of FIGS. 5(a) and 5(b), however, the fluid conduit 310 defines a tapered outer surface having a diameter which increases towards an end face of the fluid conduit 310 and the annular wedge 320 defines a complementary tapered inner surface having a diameter which increases towards the end of fluid conduit 310.

FIGS. 16(a) and 16(b) show a third alternative fluid conduit arrangement comprising a composite fluid conduit 410 and a composite annular wedge 420 after welding of the composite annular wedge 420 to the composite fluid conduit 410. The fluid conduit 410 comprises a PEEK inner layer 416 and a PEEK carbon fibre outer layer 418. Like the composite annular wedges 20, 220, 320, the composite annular wedge 420 comprises a PEEK carbon fibre composite material. For example, the composite sleeve 420 may comprise a PEEK inner layer and a PEEK carbon fibre outer layer. However, unlike the composite annular wedges 20, 220, 320, the composite annular wedge 420 is unitary and defines a plurality of slots 422. Each slot 422 is aligned parallel to the longitudinal axis of the composite annular wedge 420, and extends part way along a length of the composite annular wedge 420 from the frusto-conical end 430 of the composite annular wedge 420 towards an end face 434 of the fluid conduit 410. The plurality of slots 422 have a uniform circumferential distribution about the composite annular wedge 420, shown best in FIG. 16(b). The slots 422 reduce the circumferential stiffness of a section of the composite annular wedge 420 adjacent the frusto-conical end 430 of the composite annular wedge 420. This may permit an inner surface of the section of the composite annular wedge 420 adjacent the frusto-conical end 430 to be more readily compressed into compliance with an outer surface of the composite fluid conduit 410 to improve the uniformity of contact therebetween.

FIGS. 17(a)-17(c) show a fourth alternative fluid conduit arrangement comprising a composite fluid conduit 510 and a composite annular wedge 520 after welding of the composite annular wedge 520 to the composite fluid conduit 510. The fluid conduit 510 comprises a PEEK inner layer 516 and a PEEK carbon fibre outer layer 518. The composite annular wedge 520 comprises a PEEK carbon fibre composite material. For example, the composite annular wedge 520 may comprise a PEEK inner layer and a PEEK carbon fibre outer layer. Like the composite annular wedge 420 shown in FIGS. 16(a) and 16(b), the composite annular wedge 520 is unitary and defines a plurality of slots 522. Like the composite annular wedge 420 shown in FIGS. 16(a) and 16(b), the plurality of slots 522 are aligned parallel to the longitudinal axis of the composite annular wedge 520 and the plurality of slots 522 have a uniform circumferential distribution about the composite annular wedge 520, shown best in FIG. 17(a). However, unlike the composite annular wedge 420 shown in FIGS. 16(a) and 16(b), adjacent slots 522 of the composite annular wedge 520 extend from different ends of the composite annular wedge 520 as shown in the longitudinal cross-section on AA shown in FIG. 17(b) and the longitudinal cross-section on BB shown in FIG. 17(c). More specifically, a first set of alternate slots 522 extends from the frusto-conical end 530 of the composite annular wedge 520 towards an end face 534 of the fluid conduit 510, whilst a second set of alternate slots 522 extends from the end face 534 of the fluid conduit 510 towards the frusto-conical end 530 of the composite annular wedge 520. The first set of alternate slots 522 and the second set of alternate slots 522 overlap in longitudinal extent in a central section of the composite annular wedge 520.

Unlike the slots 422 defined in the composite annular wedge 420 shown in FIGS. 16(a) and 16(b), the slots 522 reduce the circumferential stiffness of the composite annular wedge 520 along the whole length of the composite annular wedge 520, particularly in the central section where the first and second sets of alternate slots 522 overlap in longitudinal extent. This may permit an inner surface of the composite annular wedge 520 to be more readily compressed into compliance with an outer surface of the composite fluid conduit 510 to improve the uniformity of contact therebetween along the whole length of the composite annular wedge 520, particularly in the central section.

It should be understood that the arrangement of the plurality of slots is not restricted to those shown in FIGS. 16(a), 16(b) and 17(a) - 17(c). For example, the number of slots may be greater or fewer than eight. The circumferential distribution of the slots around the composite annular wedge may be different, for example non-uniform. Rather than the slots 422 all extending from the frusto-conical end 430 as shown in FIGS. 16(a) and 16(b), the slots may instead all extend from the end face 434 of the fluid conduit 410. In other arrangements, the slots may not extend to either end of the composite annular wedge. For example, the slots may be located centrally along the length of the composite annular wedge. One or more of the slots may extend only part way through a thickness of the wall of the composite annular wedge. One or more of the slots may extend along the whole of the length of the composite annular wedge. Different slots may have the same longitudinal extent. Different slots may have different longitudinal extents.

The invention claimed is:

1. A method for joining primary and secondary members comprising:
   providing a primary member, a secondary member and a heating element which is joined to one of the primary and secondary members, wherein the heating element includes an electrically insulating matrix material and an electrically conductive reinforcing element extending through the matrix material;
   bringing the other of the primary and secondary members and the heating element into engagement; and
   controlling a flow of electrical current in the reinforcing element so as to resistively heat and fuse at least some of the matrix material of the heating element with a matrix material of the other of the primary and secondary members, wherein the primary and secondary members are defined by different portions of a unitary member, the method comprising forming a recess in the unitary member so as to define the primary portion of the unitary member to one side of the recess and the secondary portion of the unitary member to the other side of the recess, inserting the heating element into the recess and compressing the heating element between the primary and secondary portions of the unitary member with a compression device including a press, roller, or mold.

2. A method according to claim 1, wherein the matrix material of the primary and/or secondary member is the same as the matrix material of the heating element.

3. A method according to claim 1, wherein the primary member comprises a fluid conduit.

4. A method according to claim 1, wherein the secondary member is configured to fit on, against or around the primary member.

5. A method according to claim 1, wherein the secondary member defines an outer surface profile for engagement by a complementary surface of a connector device.

6. A method according to claim 1, wherein the secondary member defines a slot.

7. A method according to claim 1, wherein the secondary member defines a plurality of slots.

8. A method according to claim 7, wherein different slots extend from different ends of the secondary member and different slots overlap in longitudinal extent in a central section of the secondary member.

9. A method according to claim 7, wherein the slots are distributed circumferentially about the secondary member.

10. A method according to claim 1, comprising incorporating a device or element into the heating element in order to measure a temperature of the heating element during and/or after the flow of the electrical current in the reinforcing element.

11. A method according to claim 1, comprising:
    increasing the electrical current until at least some of the matrix material of the heating element melts; and
    reducing the electrical current until the melted matrix material of the heating element solidifies.

12. A method according to claim 1, comprising:
    increasing the electrical current until at least some of the matrix material of the heating element reaches a curing or setting temperature; and
    maintaining the temperature at a level to allow the matrix material to cure or set.

13. A method according to claim 1, wherein the heating element comprises a plurality of electrically conductive reinforcing elements extending through the electrically insulating matrix material.

14. A method according to claim 13, comprising driving electrical current through different reinforcing elements at different times.

15. A method according to claim 13, comprising driving the electrical current through one pair of reinforcing elements more frequently than the other plurality of reinforcing elements.

16. A method for joining primary and secondary members comprising:
    providing a primary member, a secondary member and a heating element which is joined to one of the primary and secondary members, wherein the heating element includes an electrically insulating matrix material and a plurality of electrically conductive reinforcing elements extending through the matrix material;
    bringing the other of the primary and secondary members and the heating element into engagement; and
    controlling a flow of electrical current in the reinforcing elements by driving current through different reinforcing elements at different times so as to resistively heat and fuse at least some of the matrix material of the heating element with a matrix material of the other of the primary and secondary members, wherein the primary and secondary members are defined by different portions of a unitary member, the method comprising forming a recess in the unitary member so as to define the primary portion of the unitary member to one side of the recess and the secondary portion of the unitary member to the other side of the recess, inserting the heating element into the recess and compressing the heating element between the primary and secondary portions of the unitary member.

17. A method according to claim 16, comprising driving the electrical current through one pair of reinforcing elements more frequently than the other plurality of reinforcing elements.

\* \* \* \* \*